United States Patent
Cheng et al.

(10) Patent No.: US 10,785,013 B2
(45) Date of Patent: Sep. 22, 2020

(54) PRIORITY-BASED CARRIER SELECTION IN DISTRIBUTED WIRELESS NETWORKS

(71) Applicant: QUALCOMM Incorporated, San Diego, CA (US)

(72) Inventors: Hong Cheng, Bridgewater, NJ (US); Kapil Gulati, Dover, DE (US); Sudhir Kumar Baghel, Hillsborough, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/042,922

(22) Filed: Jul. 23, 2018

(65) Prior Publication Data

US 2019/0052446 A1 Feb. 14, 2019

Related U.S. Application Data

(60) Provisional application No. 62/544,553, filed on Aug. 11, 2017.

(51) Int. Cl.
*H04W 48/18* (2009.01)
*H04L 5/00* (2006.01)
(Continued)

(52) U.S. Cl.
CPC ............ *H04L 5/0098* (2013.01); *H04L 5/001* (2013.01); *H04L 69/22* (2013.01); *H04W 72/02* (2013.01);
(Continued)

(58) Field of Classification Search
CPC ....... H04L 5/001; H04L 5/0098; H04L 69/22; H04W 4/46; H04W 72/02;
(Continued)

(56) References Cited

U.S. PATENT DOCUMENTS

| | | | |
|---|---|---|---|
| 2019/0052446 A1* | 2/2019 | Cheng | H04W 76/14 |
| 2019/0150082 A1* | 5/2019 | Kedalagudde | G08G 1/22 |
| 2019/0230572 A1* | 7/2019 | Cheng | H04L 47/24 |

OTHER PUBLICATIONS

Huawei., et al., "Multicarrier Operation for PC5-based V2V", 3GPP Draft; R2-163814, Multicarrier Operation for PC5-based V2V, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 22, 2016 (May 22, 2016), XP051105220, 3 pages, Retrieved from the Internet: URL: http://www.3gpp.org/ftp/Meetings_3GPP_SYNC/RAN2/Docs/ , [retrieved on May 22, 2016].

(Continued)

*Primary Examiner* — Phuc H Tran
(74) *Attorney, Agent, or Firm* — Holland & Hart LLP

(57) ABSTRACT

Methods, systems, and devices for wireless communication are described that provide for priority-based carrier selection in a system using multiple component carriers (CCs). A mapping may be provided that maps different applications that may be present at a user equipment (UE) to one or more CCs. Each application may have an associated application priority, and each carrier associated with an application may also have an associated CC priority. A UE may select a subset of CCs for a transmission based on the mapping between an application providing a packet for the transmission and the priority associated with each CC. A UE, when receiving transmissions, may identify one or more applications running at the UE and use the mapping to determine a subset of CCs to monitor for transmissions.

28 Claims, 13 Drawing Sheets

(51) Int. Cl.
    *H04W 72/02*     (2009.01)
    *H04W 76/14*     (2018.01)
    *H04L 29/06*     (2006.01)
    *H04W 72/04*     (2009.01)
    *H04W 72/12*     (2009.01)
    *H04W 72/10*     (2009.01)
    *H04W 4/46*     (2018.01)

(52) U.S. Cl.
    CPC ... *H04W 72/0453* (2013.01); *H04W 72/1247* (2013.01); *H04W 76/14* (2018.02); *H04W 4/46* (2018.02); *H04W 72/10* (2013.01)

(58) Field of Classification Search
    CPC ............. H04W 72/0453; H04W 72/10; H04W 72/1247; H04W 76/14

See application file for complete search history.

(56) References Cited

OTHER PUBLICATIONS

Intel Corporation: "On Carrier Aggregation for LTE V2V Sidelink Communication", 3GPP Draft; R1-1705446, Intel—V2X SLCA, 3rd Generation Partnership Project, (3GPP), Mobile Competence Centre, 650, Route Des Lucioles, F-06921, Sophia Antipolls Cedex, France, vol. RAN WG1, No. Spokane, USA; Apr. 3, 2017-Apr. 7, 2017, Apr. 2, 2017 (2817-04-02), XP051243576, 9 pages, Retrieved from the Internet: URL: http://www.3gpp.org/ftp/Meetings_3GPP_SYNC/RAN1/Docs/ [retrieved on Apr. 2, 2017].
International Search Report and Written Opinion—PCT/US2018/043510—ISA/EPO—dated Sep. 28, 2018.
Qualcomm Incorporated: "Carrier Aggregation for V2X Phase 2", 3GPP Draft; R1-1708786, 3rd Generation Partnership Project (3GPP), Mobile Competence Centre; 650, Route Des Lucioles; F-06921, Sophia-Antipolis Cedex; France, vol. RAN WG1, No. Hangzhou, China; May 15, 2017-May 19, 2017, May 6, 2017 (May 6, 2017), XP051262661, 2 pages, Retrieved from the Internet: URL: http://www.3gpp.org/ftpjtsg ran/WG1_RL1/TSGRI_89/Docs/ [retrieved on May 6, 2017].

* cited by examiner

PRIORITY-BASED CARRIER SELECTION IN DISTRIBUTED WIRELESS NETWORKS

CROSS REFERENCES

The present Application for Patent claims the benefit of U.S. Provisional Patent Application No. 62/544,553 by Cheng, et al., entitled "Priority-Based Carrier Selection in Distributed Wireless Networks," filed Aug. 11, 2017, assigned to the assignee hereof, and expressly incorporated herein by reference in its entirety.

BACKGROUND

The following relates generally to wireless communication in a distributed wireless network, and more specifically to priority-based carrier selection in distributed wireless networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications) and may support various radio frequency and/or baseband capabilities. In some cases, UEs within the network may be capable of operating over different component carriers having different transmission and/or reception frequencies in a carrier aggregation scheme. In some cases, a transmitting UE and a receiving UE may have different capabilities. For example, a UE may transmit over a frequency not monitored by a UE intended for reception (e.g., if the UE intended for reception does not support reception over the frequency). Such scenarios may result in decreased system performance (e.g., due to reception failures) and, in some cases, inefficient resource utilization (e.g., due to retransmissions, additional transmissions over other frequencies not supported by the intended UE, etc.). Furthermore, in some cases messages may be safety-related messages and a delay in reception may result in unsafe conditions. Improved techniques for UE carrier selection in distributed wireless networks may thus be desired.

SUMMARY

The described techniques relate to improved methods, systems, devices, or apparatuses that support priority-based carrier selection in distributed wireless networks. Generally, the described techniques provide for mapping different applications that may be present at a user equipment (UE) to one or more component carriers (CCs). Each application may have an associated application priority, and each carrier associated with an application may also have an associated CC priority. The mapping may be configured by a central node, such as a base station or an entity at a core network, to provide that high priority messages (e.g., safety-related messages) are transmitted using one or more CCs that are to be monitored by all UEs and lower priority messages (e.g., a non-critical status indicator) may be transmitted using one or more CCs that may be monitored by only certain UEs. A UE may select a subset of CCs for a transmission based on the mapping between an application providing a packet for the transmission and the priority associated with each CC. A UE, when receiving transmissions, may identify one or more applications running at the UE and use the mapping to determine a subset of CCs to monitor for transmissions.

A method of wireless communication in a distributed wireless network is described. The method may include identifying a mapping between one or more applications at a first UE in the distributed wireless network and one or more component carriers of a set of available component carriers for transmissions between one or more other UEs in the distributed wireless network, determining a priority associated with each component carrier of the set of available component carriers, selecting a first subset of component carriers for transmitting a first transmission of a first application of the one or more applications based at least in part on the mapping, and the priority associated with each component carrier, and transmitting the first transmission using the selected first subset of component carriers to the one or more other UEs.

An apparatus for wireless communication in a distributed wireless network is described. The apparatus may include means for identifying a mapping between one or more applications at a first UE in the distributed wireless network and one or more component carriers of a set of available component carriers for transmissions between one or more other UEs in the distributed wireless network, means for determining a priority associated with each component carrier of the set of available component carriers, means for selecting a first subset of component carriers for transmitting a first transmission of a first application of the one or more applications based at least in part on the mapping, and the priority associated with each component carrier, and means for transmitting the first transmission using the selected first subset of component carriers to the one or more other UEs.

Another apparatus for wireless communication in a distributed wireless network is described. The apparatus may include a processor, memory in electronic communication with the processor, and instructions stored in the memory. The instructions may be operable to cause the processor to identify a mapping between one or more applications at a first UE in the distributed wireless network and one or more component carriers of a set of available component carriers for transmissions between one or more other UEs in the distributed wireless network, determine a priority associated with each component carrier of the set of available component carriers, select a first subset of component carriers for transmitting a first transmission of a first application of the one or more applications based at least in part on the mapping, and the priority associated with each component carrier, and transmit the first transmission using the selected first subset of component carriers to the one or more other UEs.

A non-transitory computer readable medium for wireless communication in a distributed wireless network is described. The non-transitory computer-readable medium may include instructions operable to cause a processor to identify a mapping between one or more applications at a first UE in the distributed wireless network and one or more component carriers of a set of available component carriers for transmissions between one or more other UEs in the distributed wireless network, determine a priority associated with each component carrier of the set of available component carriers, select a first subset of component carriers for transmitting a first transmission of a first application of the one or more applications based at least in part on the mapping, and the priority associated with each component carrier, and transmit the first transmission using the selected first subset of component carriers to the one or more other UEs.

Some examples of the method, apparatus, and non-transitory computer-readable medium described above may further include processes, features, means, or instructions for determining a priority associated with each of the one or more applications, and wherein the selecting further comprises selecting the first subset of component carriers based at least in part on the priority associated with the first application and the priority associated with each component carrier.

Some examples of the method, apparatus, and non-transitory computer-readable medium described above may further include processes, features, means, or instructions for identifying a first packet that may be to be transmitted in the first transmission, the first packet having a first packet priority, and wherein the selecting further comprises selecting the first subset of component carriers based at least in part on the first packet priority, the priority associated with the first application and the priority associated with each component carrier.

Some examples of the method, apparatus, and non-transitory computer-readable medium described above may further include processes, features, means, or instructions for selecting a second subset of component carriers for receiving a second transmission from one of the one or more other UEs in the distributed wireless network based at least in part on the mapping and the priority associated with each component carrier.

In some examples of the method, apparatus, and non-transitory computer-readable medium described above, the selecting the first subset of component carriers may be further based at least in part on an amount of traffic detected on one or more of component carriers of the set of available component carriers. In some examples of the method, apparatus, and non-transitory computer-readable medium described above, the amount of traffic detected on one or more of component carriers may be determined based at least in part on a number of transmissions detected on each component carrier of the set of available component carriers during a time period prior to transmitting the first transmission.

In some examples of the method, apparatus, and non-transitory computer-readable medium described above, the set of available component carriers includes component carriers on which the first UE may be configured to support transmission and receipt of communications in the distributed wireless network.

In some examples of the method, apparatus, and non-transitory computer-readable medium described above, the first subset of component carriers includes component carriers on which the one or more other UEs may be monitoring for communications in the distributed wireless network.

Some examples of the method, apparatus, and non-transitory computer-readable medium described above may further include processes, features, means, or instructions for receiving the mapping in one or more of an RRC configuration message or a SIB transmitted by a base station, or any combinations thereof. Some examples of the method, apparatus, and non-transitory computer-readable medium described above may further include processes, features, means, or instructions for receiving the mapping in one or more of an Open Mobile Alliance Device Management (OMA-DM) message from a vehicle-to-everything (V2X) control function at a core network, a unicast message from a third party V2X application server (AS) at the core network, a multimedia broadcast multicast service (MBMS) message from the V2X control function or the V2X AS, or any combinations thereof. In some examples of the method, apparatus, and non-transitory computer-readable medium described above, the first transmission may be transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or via combinations thereof. In some examples of the method, apparatus, and non-transitory computer-readable medium described above, the distributed wireless network supports vehicle-to-everything (V2X) communications, public safety device-to-device (D2D) communications, peer-to-peer (P2P) communications, or combinations thereof.

A method of wireless communication in a distributed wireless network is described. The method may include identifying a mapping between one or more applications at a first UE in the distributed wireless network and one or more component carriers of a set of available component carriers for transmissions between one or more other UEs in the distributed wireless network, determining a priority associated with each component carrier of the set of available component carriers, selecting a first subset of component carriers for receiving a first transmission from one of the one or more other UEs in the distributed wireless network based at least in part on the mapping and the priority associated with each component carrier, monitoring the selected first subset of component carriers for the first transmission, and receiving the first transmission using the selected first subset of component carriers.

An apparatus for wireless communication in a distributed wireless network is described. The apparatus may include means for identifying a mapping between one or more applications at a first UE in the distributed wireless network and one or more component carriers of a set of available component carriers for transmissions between one or more other UEs in the distributed wireless network, means for determining a priority associated with each component carrier of the set of available component carriers, means for selecting a first subset of component carriers for receiving a first transmission from one of the one or more other UEs in the distributed wireless network based at least in part on the mapping and the priority associated with each component carrier, means for monitoring the selected first subset of component carriers for the first transmission, and means for receiving the first transmission using the selected first subset of component carriers.

Another apparatus for wireless communication in a distributed wireless network is described. The apparatus may include a processor, memory in electronic communication with the processor, and instructions stored in the memory. The instructions may be operable to cause the processor to identify a mapping between one or more applications at a first UE in the distributed wireless network and one or more component carriers of a set of available component carriers for transmissions between one or more other UEs in the distributed wireless network, determine a priority associated with each component carrier of the set of available component carriers, select a first subset of component carriers for receiving a first transmission from one of the one or more other UEs in the distributed wireless network based at least in part on the mapping and the priority associated with each component carrier, monitor the selected first subset of component carriers for the first transmission, and receive the first transmission using the selected first subset of component carriers.

A non-transitory computer readable medium for wireless communication in a distributed wireless network is described. The non-transitory computer-readable medium may include instructions operable to cause a processor to identify a mapping between one or more applications at a first UE in the distributed wireless network and one or more component carriers of a set of available component carriers for transmissions between one or more other UEs in the distributed wireless network, determine a priority associated with each component carrier of the set of available component carriers, select a first subset of component carriers for receiving a first transmission from one of the one or more other UEs in the distributed wireless network based at least in part on the mapping and the priority associated with each component carrier, monitor the selected first subset of component carriers for the first transmission, and receive the first transmission using the selected first subset of component carriers.

Some examples of the method, apparatus, and non-transitory computer-readable medium described above may further include processes, features, means, or instructions for determining a priority associated with each of the one or more applications, and wherein the selecting further comprises selecting the first subset of component carriers based at least in part on the priority associated with the first application and the priority associated with each component carrier.

Some examples of the method, apparatus, and non-transitory computer-readable medium described above may further include processes, features, means, or instructions for selecting a second subset of component carriers for transmitting a second transmission to the one or more other UEs in the distributed wireless network based at least in part on the mapping and the priority associated with each component carrier.

In some examples of the method, apparatus, and non-transitory computer-readable medium described above, the set of available component carriers includes component carriers on which the first UE may be configured to support transmission and receipt of communications in the distributed wireless network. In some examples of the method, apparatus, and non-transitory computer-readable medium described above, the first subset of component carriers includes component carriers on which the one or more other UEs may transmit communications in the distributed wireless network.

Some examples of the method, apparatus, and non-transitory computer-readable medium described above may further include processes, features, means, or instructions for receiving the mapping in one or more of an RRC configuration message or a SIB transmitted by a base station, or any combinations thereof. Some examples of the method, apparatus, and non-transitory computer-readable medium described above may further include processes, features, means, or instructions for receiving the mapping in one or more of an Open Mobile Alliance Device Management (OMA-DM) message from a vehicle-to-everything (V2X) control function at a core network, a unicast message from a third party V2X application server (AS) at the core network, a multimedia broadcast multicast service (MBMS) message from the V2X control function or the V2X AS, or any combinations thereof. In some examples of the method, apparatus, and non-transitory computer-readable medium described above, the first transmission may be transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or via combinations thereof. In some examples of the method, apparatus, and non-transitory computer-readable medium described above, the distributed wireless network supports vehicle-to-everything (V2X) communications, public safety device-to-device (D2D) communications, peer-to-peer (P2P) communications, or combinations thereof.

DETAILED DESCRIPTION

Figure 1:
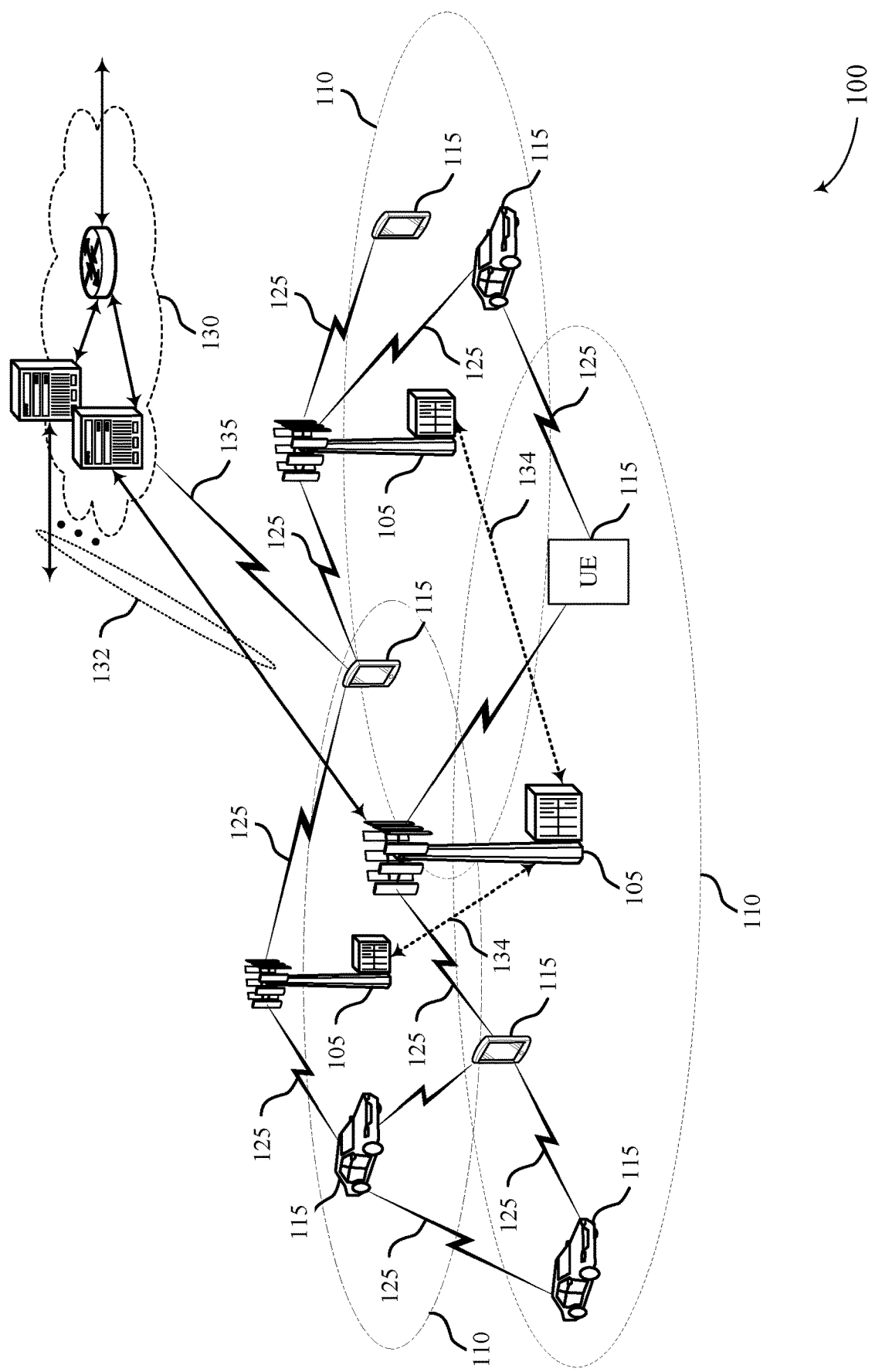
FIG. 1 illustrates an example of a system for wireless communication in a distributed wireless network that supports priority-based carrier selection in distributed wireless networks in accordance with aspects of the present disclosure.

Some wireless communication systems may be used to facilitate communications with various devices, which may include vehicles and these systems may sometimes be referred to as vehicle-to-everything (V2X) communication systems. V2X communication systems may be configured to convey important information to a driver regarding inclement weather, nearby accidents, road conditions, and/or the dangerous activities of nearby vehicles. V2X communication systems may also be used by autonomous vehicles (self-driving vehicles) and may provide extra information beyond the reach of the vehicle's existing system. In some cases, vehicles may communicate directly with each other using device-to-device (D2D) communications over a D2D wireless link. For example, a sensor device in a communication system may broadcast information that it sensed (e.g., indicative of objects or conditions in the vicinity of the sensor). Nearby devices (e.g., a user equipment (UE) in a nearby vehicle, or other devices) may receive the broadcast information and may thereby determine whether and how to take action based on the sensed objects or conditions. The use of vehicle-related networks and applications is expected to increase substantially and in some examples, carrier aggregation (CA) techniques may use concurrent transmissions on multiple component carriers (CCs) to enhance communications throughput and reliability.

Various techniques discussed herein provide for selection of CCs for transmission or reception of communications that may increase the likelihood that higher priority messages are successfully transmitted between devices. In some cases, different UEs may have different CA capabilities, such as a number of CCs supported for concurrent transmissions or reception. For example, certain UEs may have a capability to receive using four concurrent CCs on four receive chains, while other UEs may have a capability to receive two concurrent CCs. Additionally, some UEs may not support CA operation at all, and may transmit/receive on only a single transmit/receive chain. Priority-based carrier selection techniques discussed herein may provide for mapping of different applications that may be present at a UE to one or more CCs. Each application may have an associated application priority, and each CC associated with an application may also have an associated CC priority. Based on the mapping and CC priority, a UE may select one or more CCs for transmission/reception.

The mapping may be configured by a central node, such as a base station or an entity at a core network or a third party central V2X control server to provide that high priority messages (e.g., safety-related messages) are transmitted using one or more CCs that are to be monitored by all UEs and lower priority messages (e.g., a non-critical status indicator) may be transmitted using one or more CCs that may be monitored by only certain UEs. A UE may select a subset of CCs for a transmission based on the mapping between an application providing a packet for the transmission and the priority associated with each CC. A UE, when receiving transmissions, identify one or more applications running at the UE and use the mapping to determine a subset of CCs to monitor for transmissions.

Aspects of the disclosure are initially described in the context of a wireless communications system. Aspects of the disclosure are illustrated by and described with reference to V2X communication system diagrams that relate to techniques for priority-based carrier selection in a V2X communication system. Aspects of the disclosure are further illustrated by and described with reference to apparatus diagrams, system diagrams, and flowcharts that relate to priority-based carrier selection in distributed wireless networks.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, other UEs 115 and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, downlink transmissions from a base station 105 to a UE 115, or sidelink transmissions between two UEs 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a V2X, peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service. In some cases, device-to-device communications may be supported by an entity running at the core network 130, such as an Open Mobile Alliance Device Management (OMA-DM) message vehicle-to-everything (V2X) control function or a third party V2X application server (AS), which may provide communications to UEs 115 via a multimedia broadcast multicast service (MBMS) message from the V2X control function or the V2X AS, for example.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users. Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

As indicated above, different UEs 115 may have different CA capabilities. For example, a first UE 115 may support four concurrent receive chains and two concurrent transmit chains, while a second UE 115 may support four concurrent transmit and receive chains. In some cases, UEs 115 may select CCs for transmission or reception of communications that may increase the likelihood that higher priority messages are successfully transmitted between devices. In some cases, a base station 105 or an entity at the core network 130 may provide for mapping of different applications that may be present at a UE to one or more CCs. Each application may have an associated application priority, and each CC associated with an application may also have an associated CC priority. Based on the mapping and CC priority, a UE 115 may select one or more CCs for transmission/reception.

Figure 2:
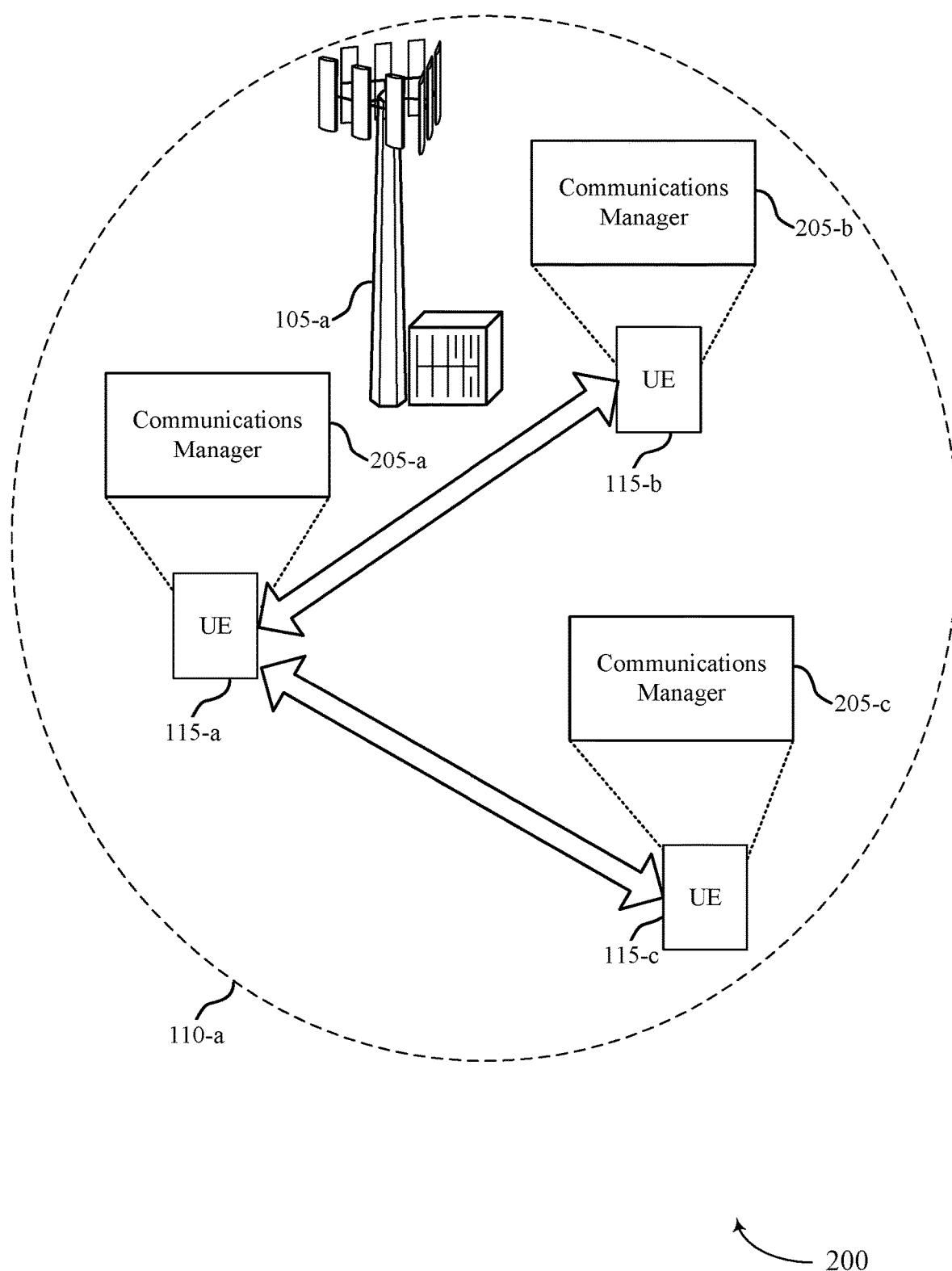
FIG. 2 illustrates an example of a portion of a V2X distributed wireless network that supports priority-based carrier selection in distributed wireless networks in accordance with aspects of the present disclosure.

FIG. 2 illustrates an example of a portion of a V2X distributed wireless network 200 that supports priority-based carrier selection in distributed wireless networks in accordance with various aspects of the present disclosure. In some examples, V2X distributed wireless network 200 may implement aspects of wireless communications system 100. V2X system 200 may include a base station 105-*a* and UEs 115-*a*, 115-*b* and 115-*c* that may be present in coverage area 110-*a*. In some cases, UEs 115 may be integrated with a vehicle. UEs 115-*a*, 115-*b* and/or 115-*c* may be examples of a UE 115 described with reference to FIG. 1 (e.g. a phone, laptop, vehicle, etc.), and may be configured for V2X communication over one or more carriers. In some examples, UEs 115 may execute one or more sets of codes or sequences, to control the functional elements of the device, and perform some or all of the functions described below. In some cases, a communications manager 205 at each UE 115 may manage the selection of CCs for transmissions and receptions according to priority-based carrier selection techniques as discussed herein. While various examples described herein illustrate V2X communications using LTE or NR between UEs 115, it will be understood that techniques provided herein may be used in other communications systems that may use different radio access technologies (RATs) and communications protocols.

In some cases, base station 105-*a* may transmit a configuration to each UE 115 that indicates a mapping between certain applications that may run at each UE 115 and one or more CCs that may be available for transmissions. In some cases, each UE 115 may have one or more applications running at an application layer, and a V2X layer at the UE 115 may be configured, based on the mapping, with a list of application to carriers mapping. Additionally, each application may have an associated application priority, and each CC associated with the application may also have an associated carrier priority. The V2X layer at each UE 115 may compile an overall transmit and receive carrier list based on the application and carrier priorities, and may configure its RRC layer accordingly (e.g., semi-statically), which in turn configures the MAC layer on receive and transmit. When a packet is sent down by the application layer, the V2X layer may identify the application (e.g., by a provider service identification (PSID) or Intelligent Transportation Systems Application Identifier (ITS-AID) of the application) and identify CCs that are mapped to the application and a priority of the application. The V2X layer may identify carrier priorities, and in some cases a packet priority for a packet that is to be transmitted (e.g., based on a ProSe Per-Packet Priority (PPPP) or another service specific priority value). Based on the mapping and priorities, the V2X layer may select a subset of CCs that can be used for this packet. The MAC layer at the UE 115 may then determine which carrier(s) to use for transmission based on the subset of carriers associated with this packet and the configuration from RRC. In some examples, the UE 115 may further select one or more CCs based on a traffic level or congestion level of each CC of the subset of CCs (e.g., based on a number of transmissions monitored on the CCs during a time window, or based on the load level or congestion level sensed on the CCs).

When a UE 115 is to monitor for transmissions of other UEs 115, a similar procedure may be performed. In some cases, a V2X layer at a UE 115 may identify applications that are running in an application layer and identify CCs that are mapped to the applications and a priority of the applications. The V2X layer may identify carrier priorities and, based on the mapping and priorities, may select a subset of CCs that are to be monitored for transmissions. For example, if a UE 115 identifies three applications having different priorities and two different packet priorities in each application, it can sort the CCs based on the mapping and identify a priority level for each application that may be received. In some cases, the UE 115 may provide an indication of monitored priority levels to other UEs 115. The UE 115 may also provide an indication to an application on which packet priority level for the application is supported, with the sorted CCs and the supported receiving chains.

Figure 3:
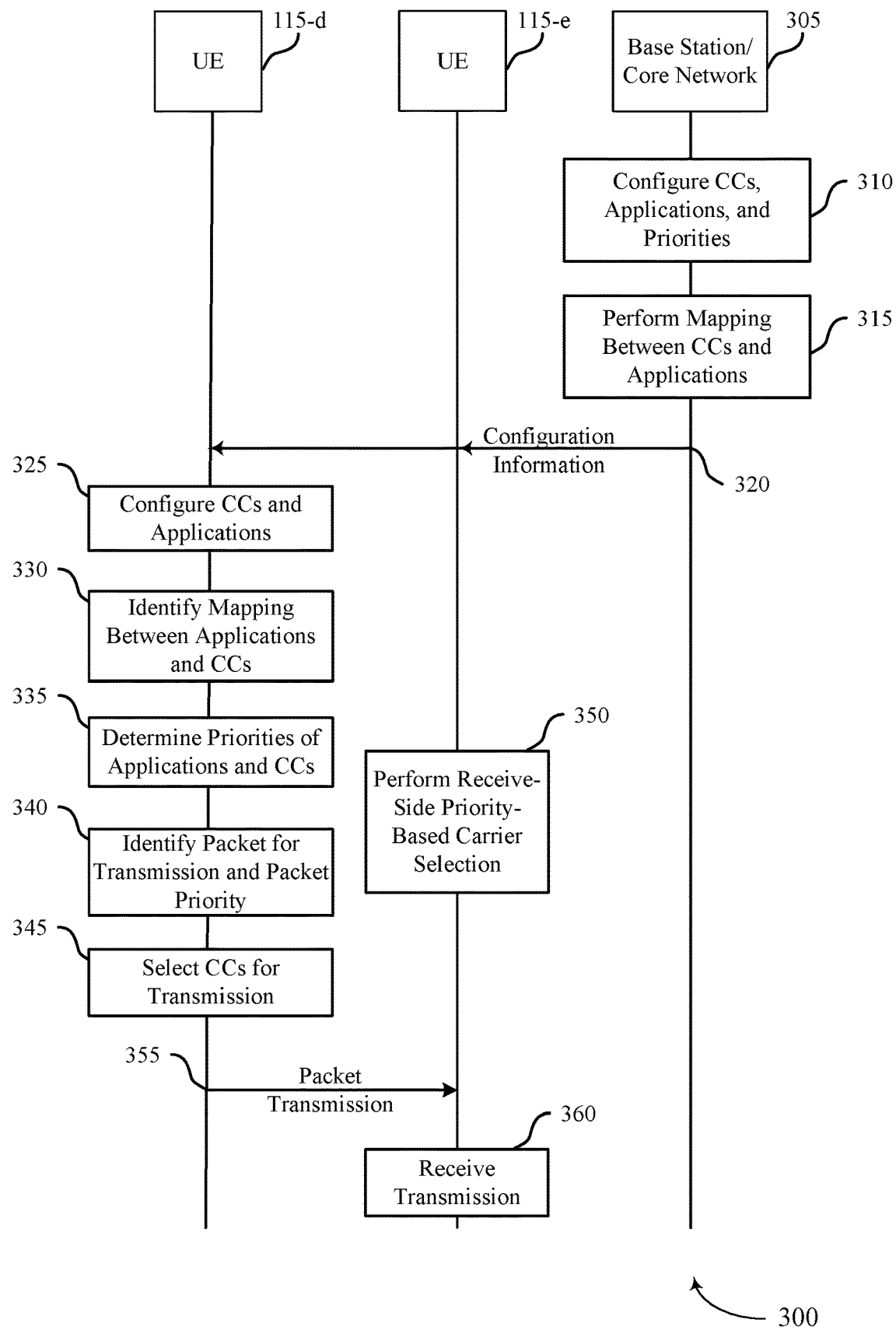
FIGS. 3 and 4 illustrates examples of process flows that support priority-based carrier selection in distributed wireless networks in accordance with aspects of the present disclosure.

FIG. 3 illustrates an example of a process flow 300 that supports priority-based carrier selection in distributed wireless networks in accordance with various aspects of the present disclosure. In some examples, process flow 300 may implement aspects of the V2X distributed wireless network 200 and the wireless communications system 100. Process flow 300 may represent aspects of techniques performed by a first UE 115-*d*, a second UE 115-*e*, and central node 305 such as a base station 105 or core network 130, which may represent the corresponding devices as described with reference to FIGS. 1-2.

At block 310, the central node 305 may configure CCs, applications, and priorities for potential communications between UEs 115. In some cases, CCs may be configured by a base station 105 based on conditions within a region or coverage area 110. At block 315, the central node 305 may perform a mapping between CCs and applications that may be run at the UEs 115. In some cases, the mapping may include a table of applications, CCs associated with the applications, a CC priority, an application priority, and optionally packet priorities for different packet types that may be generated from an application for transmission.

The central node 305 may provide configuration information 320 to each UE 115, which may include the mapping and priority information. In some cases, the configuration information 320 may be configured based on a region in which the UEs 115 are located and may be, for example, transmitted in a system information block (SIB) or in an RRC signaling from a base station 105. In some cases, an entity running at a core network 130 (e.g., an V2X control function or a third party V2X Application Server (AS) running at the core network 130) may communicate the configuration information to the UEs 115 (e.g., via OMA-DM mechanism, unicast communication, or an MBMS message).

The first UE 115-*d*, at block 325, may configure CCs and identify one or more applications that are running at an application layer at the first UE 115-*d*. In some cases, the CCs are configured based on an RRC signaling received from a base station 105, in accordance with a RAT that is to be used for V2X communications with other UEs 115 such as second UE 115-*e*. In some case, the first UE 115-*d* may identify the applications running at the application layer based on application IDs, which may correspond to application IDs included in the mapping provided in the configuration information 320.

At block 330, the first UE 115-*d* may identify the mapping between the applications and CCs. In some cases, as discussed above, the configuration information 320 may include a mapping between applications and CCs, and for each application running at the first UE 115-*d*, the mapped CCs may be identified.

At block 335, the first UE 115-*d* may determine priorities of applications and CCs. Such a determination may be based on the configuration information 320, which may identify priorities of certain applications. In some cases, priorities of applications may be preconfigured, based on functions provided by each application. CC priority may also be provided in the configuration information, and may identify for each application (and optionally for different packet priorities) the associated CCs and priority among each CC among the CCs associated with each application.

At block 340, the first UE 115-*d* may identify a packet for transmission and an associated packet priority. In some case, a V2X layer at the first UE 115-*d* may receive the packet from the application layer. The V2X layer may identify the application that provided the packet (e.g., by a PSID or ITS-AID), and may identify the packet priority for the particular packet (e.g., based on a PPPP).

At block 345, the first UE 115-*d* may select CCs for transmission of the packet. The CCs may be selected, as discussed above, based on the identified priorities of the application that provided the packet, the packet priority, and the mapping provided in the configuration information. Thus, if the packet is a relatively low priority packet or received from a relatively low priority application, the CCs may be selected such that certain lower capability UEs 115 may not monitor for the packet. Similarly, if the packet is a high priority packet from a high priority application (e.g., a safety-related packet), the CCs may be selected such that each UE 115 present in the system may monitor for the packet.

At block 350, the second UE 115-*e* may perform receive-side priority-based carrier selection. As discussed above, and as will be described in more detail with reference to FIG. 4, such carrier selection for reception of transmissions may be based on applications running at the second UE 115-*e*, priorities of the applications and available CCs, and the mapping provided in the configuration information.

The first UE 115-*d* may perform packet transmission 355 using the selected CCs. The second UE 115-*e*, at block 360, may receive the transmission in cases where it is monitoring the selected CCs. In some cases, the packet transmission may be via a V2X message payload, via a Packet Data Convergence Protocol (PDCP) header extension, via a media access control (MAC) payload, as advertised by a metadata bit included in a sidelink control information (SCI) message, or via combinations thereof.

Figure 4:
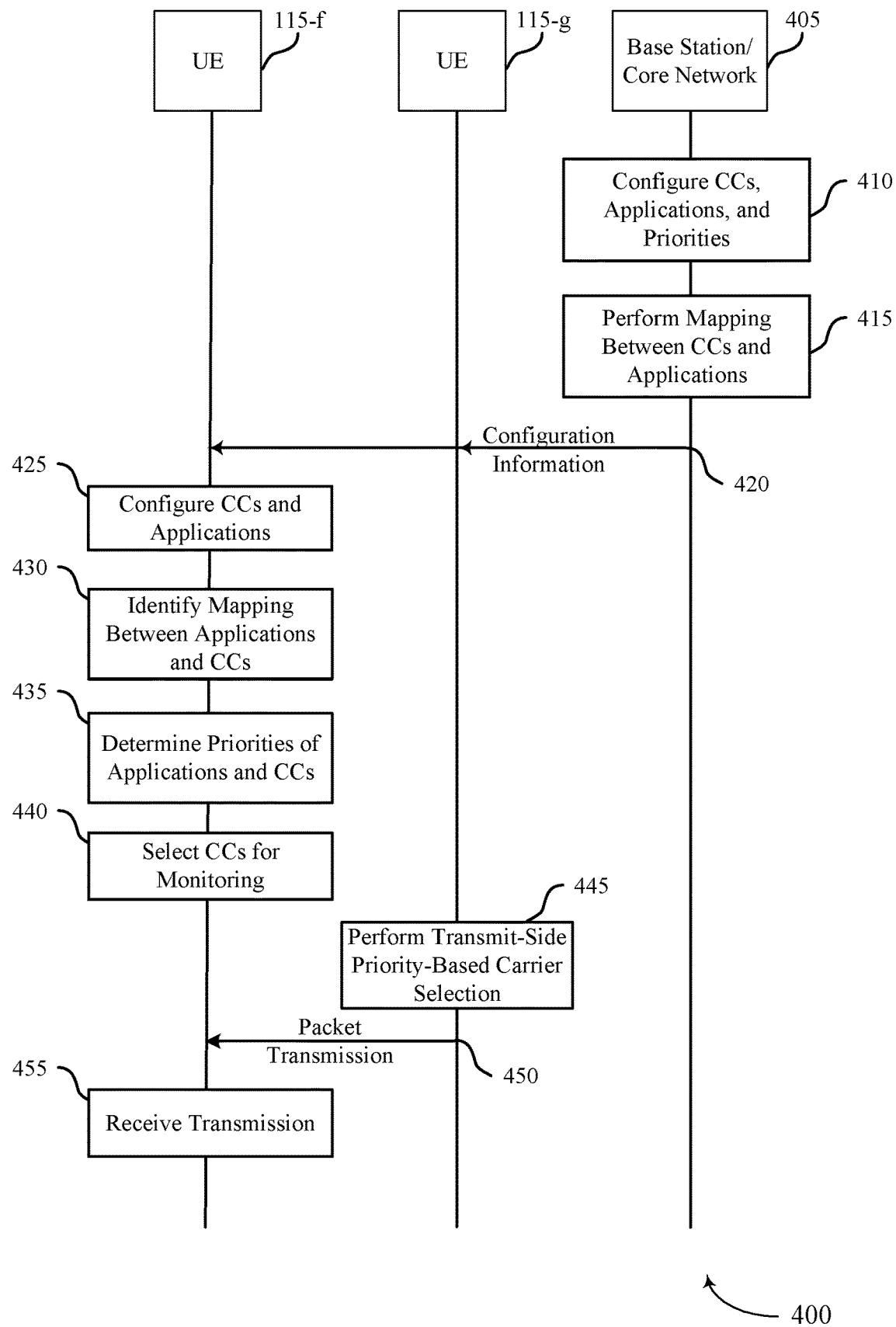

FIG. 4 illustrates an example of a process flow 400 that supports priority-based carrier selection in distributed wireless networks in accordance with various aspects of the present disclosure. In some examples, process flow 400 may implement aspects of the V2X distributed wireless network 200 and the wireless communications system 100. Process flow 400 may represent aspects of techniques performed by a first UE 115-*f*, a second UE 115-*g*, and central node 405 such as a base station 105 or core network 130, which may represent the corresponding devices as described with reference to FIGS. 1-2.

At block 410, the central node 405 may configure CCs, applications, and priorities for potential communications between UEs 115. In some cases, CCs may be configured by a base station 105 based on conditions within a region or coverage area 110. At block 415, the central node 405 may perform a mapping between CCs and applications that may be run at the UEs 115. In some cases, the mapping may include a table of applications, CCs associated with the applications, a CC priority, an application priority, and optionally packet priorities for different packet types that may be generated from an application for transmission.

The central node 405 may provide configuration information 420 to each UE 115, which may include the mapping and priority information. In some cases, the configuration information 420 may be configured based on a region in which the UEs 115 are located and may be, for example, transmitted in a system information block (SIB) or in an RRC signaling from a base station 105. In some cases, an entity running at a core network 130 (e.g., an OMA-DM V2X control function or a third party V2X AS running at the core network 130) may communicate the configuration information to the UEs 115 (e.g., via an MBMS message from the V2X control function or the V2X AS).

The first UE 115-*f*, at block 425, may configure CCs and identify one or more applications that are running at an application layer at the first UE 115-*f*. In some cases, the CCs are configured based on an RRC signaling received from a base station 105, in accordance with a RAT that is to be used for V2X communications with other UEs 115 such as second UE 115-*g*. In some case, the first UE 115-*f* may identify the applications running at the application layer based on application IDs, which may correspond to application IDs included in the mapping provided in the configuration information 420.

At block 430, the first UE 115-*f* may identify the mapping between the applications and CCs. In some cases, as discussed above, the configuration information 420 may include a mapping between applications and CCs, and for each application running at the first UE 115-*f*, the mapped CCs may be identified.

At block 435, the first UE 115-*f* may determine priorities of applications and CCs. Such a determination may be based on the configuration information 420, which may identify priorities of certain applications. In some cases, priorities of applications may be preconfigured, based on functions provided by each application. CC priority may also be provided in the configuration information, and may identify for each application (and optionally for different packet priorities) the associated CCs and priority among each CC among the CCs associated with each application.

At block 440, the first UE 115-*f* may select CCs for monitoring of transmission from other UEs 115. The CCs may be selected, as discussed above, based on the identified priorities of the applications running at the first UE 115-*f*, and the mapping provided in the configuration information. Thus, if relatively few receive chains are available for the first UE 115-*f*, CCs may be selected for monitoring such that relatively high priority applications or packets will be received, but packets having a relatively low priority or from a low priority application may not be received.

At block 455, the second UE 115-*g* may perform transmit-side priority-based carrier selection. As discussed above, and as described in more detail with reference to FIG. 3, such carrier selection for packet transmissions may be based on applications running at the second UE 115-*g*, a priority of the application that provides the packet, available CCs, and the mapping provided in the configuration information.

The second UE 115-*g* may perform packet transmission 450 using one or more CCs that are selected based on the transmit-side priority-based carrier selection. The first UE 115-*f*, at block 455, may receive the transmission in cases where it is monitoring the selected CCs. In some cases, the packet transmission may be via a V2X message payload, via a Packet Data Convergence Protocol (PDCP) header extension, via a media access control (MAC) payload, as advertised by a metadata bit included in a sidelink control information (SCI) message, or via combinations thereof.

Figure 5:
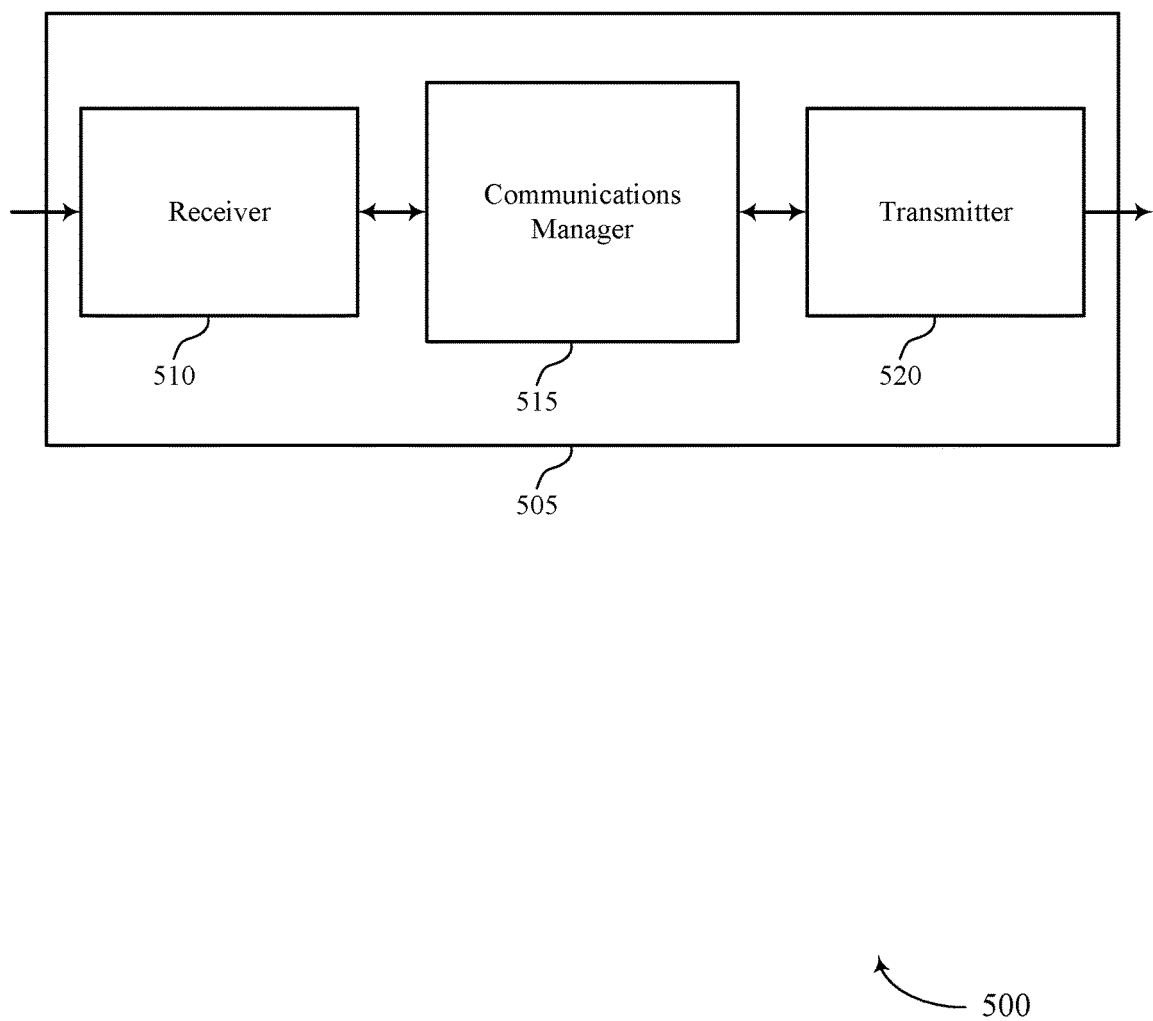
FIGS. 5 through 7 show block diagrams of a device that supports priority-based carrier selection in distributed wireless networks in accordance with aspects of the present disclosure.

FIG. 5 shows a block diagram 500 of a wireless device 505 that supports priority-based carrier selection in distributed wireless networks in accordance with aspects of the present disclosure. Wireless device 505 may be an example of aspects of a user equipment (UE) 115 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to priority-based carrier selection in distributed wireless networks, etc.). Information may be passed on to other components of the device 505. Receiver 510 may be an example of aspects of transceiver 835 described with reference to FIG. 8. Receiver 510 may utilize a single antenna or a set of antennas.

Communications manager 515 may be an example of aspects of the communications manager 815 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. Communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may identify a mapping between one or more applications at a first UE (e.g., 115-d or 115f) in the distributed wireless network and one or more component carriers of a set of available component carriers for transmissions between one or more other UEs 115 in the distributed wireless network, determine a priority associated with each component carrier of the set of available component carriers, select a first subset of component carriers for transmitting a first transmission of a first application of the one or more applications based on the mapping, and the priority associated with each component carrier, and transmit the first transmission using the selected first subset of component carriers to the one or more other UEs 115. Communications manager 515 may also identify a mapping between one or more applications at a first UE (e.g., 115-d or 115f) in the distributed wireless network and one or more component carriers of a set of available component carriers for transmissions between one or more other UEs 115 in the distributed wireless network, determine a priority associated with each component carrier of the set of available component carriers, select a first subset of component carriers for receiving a first transmission from one of the one or more other UEs 115 in the distributed wireless network based on the mapping and the priority associated with each component carrier, monitor the selected first subset of component carriers for the first transmission, and receive the first transmission using the selected first subset of component carriers.

Transmitter 520 may transmit signals generated by other components of the device. In some examples, transmitter 520 may be collocated with receiver 510 in a transceiver module. For example, transmitter 520 may be an example of aspects of transceiver 835 described with reference to FIG. 8. Transmitter 520 may utilize a single antenna or a set of antennas.

Figure 6:
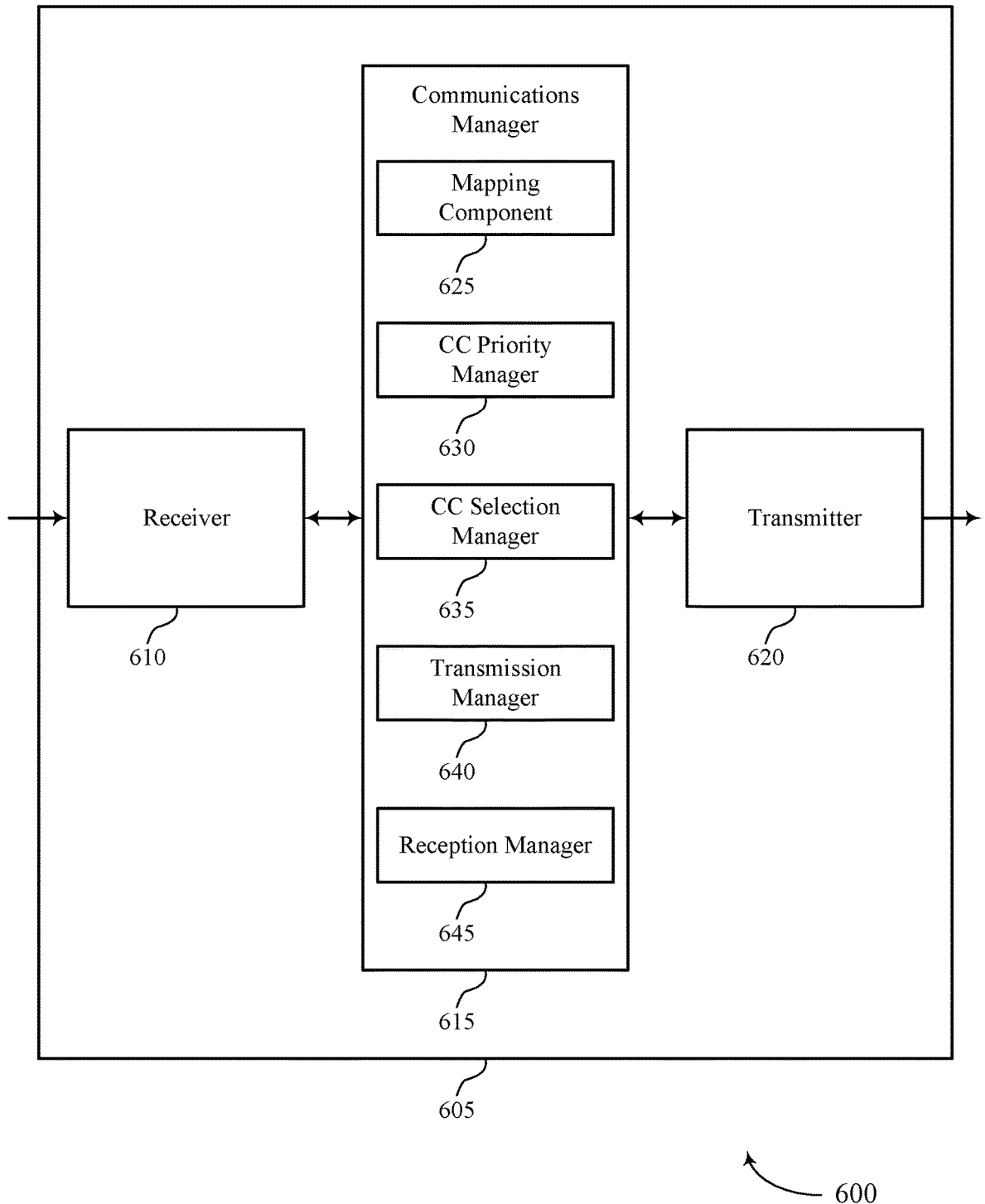

FIG. 6 shows a block diagram 600 of a wireless device 605 that supports priority-based carrier selection in distributed wireless networks in accordance with aspects of the present disclosure. Wireless device 605 may be an example of aspects of a wireless device 505 or a UE 115 as described with reference to FIG. 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to priority-based carrier selection in distributed wireless networks, etc.). Information may be passed on to other components of the wireless device 605. Receiver 610 may be an example of aspects of the transceiver 835 described with reference to FIG. 8. Receiver 610 may utilize a single antenna or a set of antennas.

Communications manager 615 may be an example of aspects of communications manager 815 described with reference to FIG. 8.

Communications manager 615 may also include mapping component 625, CC priority manager 630, CC selection manager 635, transmission manager 640, and reception manager 645.

Mapping component 625 may identify a mapping between one or more applications at a first UE (e.g., 115-d or 115f) in the distributed wireless network and one or more component carriers of a set of available component carriers for transmissions between one or more other UEs 115 in the distributed wireless network. In some cases, a UE 115 may receive the mapping in one or more of a radio resource control (RRC) configuration message or a system information block (SIB) transmitted by a base station 105, or any combinations thereof. In some cases, a UE 115 may receive the mapping in one or more of an Open Mobile Alliance Device Management (OMA-DM) message from a vehicle-to-everything (V2X) control function at a core network 130, a unicast message from a third party V2X application server (AS) at the core network 130, a multimedia broadcast multicast service (MBMS) message from the V2X control function or the V2X AS, or any combinations thereof. In some cases, packets may be transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or via combinations thereof.

CC priority manager 630 may determine a priority associated with each component carrier of the set of available component carriers.

CC selection manager 635 may select a first subset of component carriers for transmitting a first transmission of a first application of the one or more applications based on the mapping, and the priority associated with each component carrier. In some cases, CC selection manager 635 may select a second subset of component carriers for receiving a second transmission from one of the one or more other UEs 115 in the distributed wireless network based on the mapping and the priority associated with each component carrier. In some cases, the set of available component carriers includes component carriers on which the first UE (e.g., 115-d or 115f) is configured to support transmission and receipt of communications in the distributed wireless network. In some cases, the first subset of component carriers includes component carriers on which the one or more other UEs 115 are monitoring for communications in the distributed wireless network. In some cases, the set of available component carriers includes component carriers on which the first UE (e.g., 115-d or 115f) is configured to support transmission and receipt of communications in the distributed wireless network. In some cases, the first subset of component carriers includes component carriers on which the one or more other UEs 115 may transmit communications in the distributed wireless network.

Transmission manager 640 may transmit the first transmission using the selected first subset of component carriers to the one or more other UEs 115. In some cases, the distributed wireless network supports vehicle-to-everything (V2X) communications, public safety device-to-device (D2D) communications, peer-to-peer (P2P) communications, or combinations thereof. Reception manager 645 may monitor the selected subset of component carriers for a transmission and receive the transmission using the selected subset of component carriers.

Transmitter 620 may transmit signals generated by other components of the device. In some examples, transmitter 620 may be collocated with receiver 610 in a transceiver module. For example, transmitter 620 may be an example of aspects of transceiver 835 described with reference to FIG. 8. Transmitter 620 may utilize a single antenna or a set of antennas.

Figure 7:
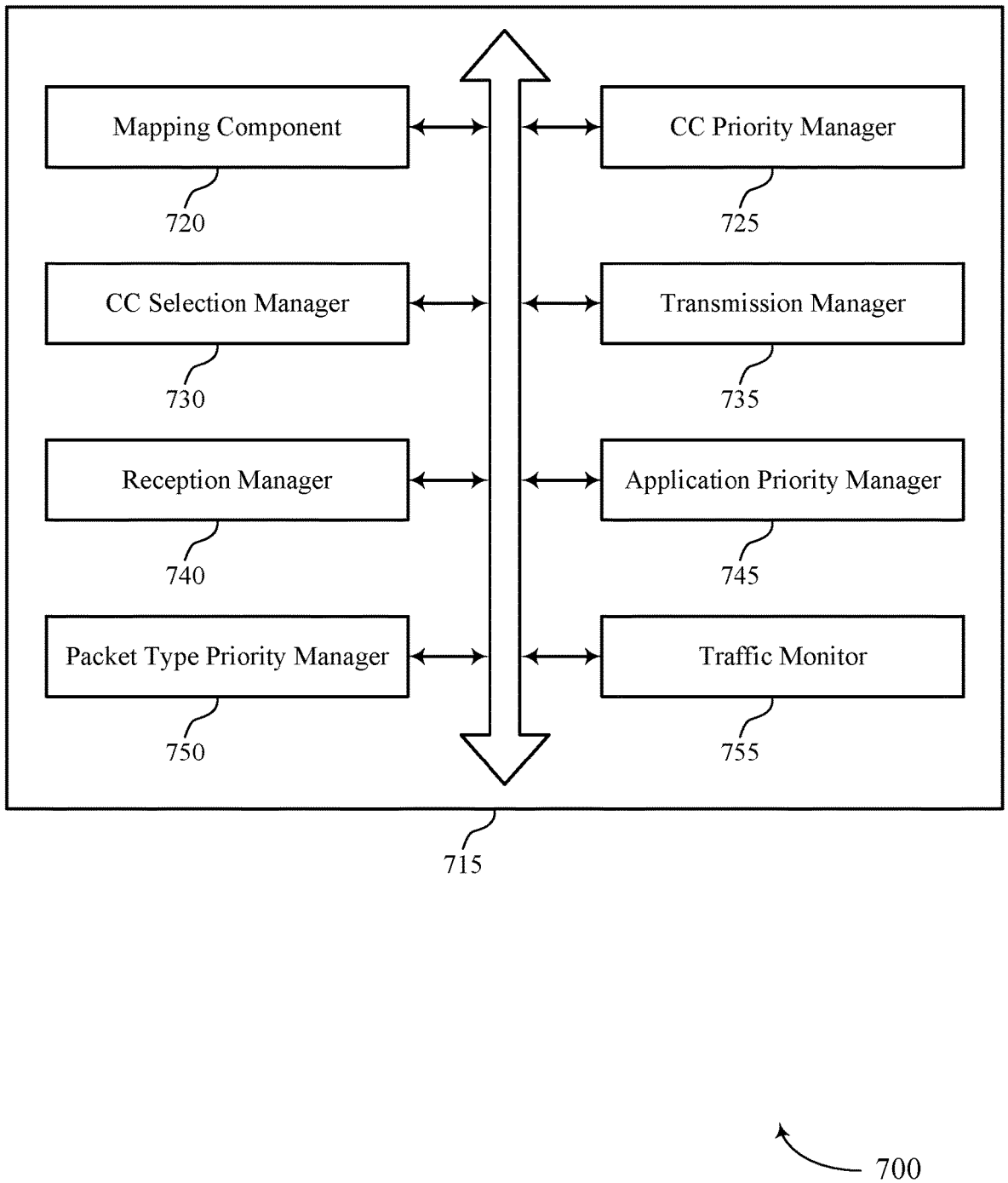

FIG. 7 shows a block diagram 700 of communications manager 715 that supports priority-based carrier selection in distributed wireless networks in accordance with aspects of the present disclosure. Communications manager 715 may be an example of aspects of communications manager 515, 615, or 815 described with reference to FIGS. 5, 6, and 8. Communications manager 715 may include mapping component 720, CC priority manager 725, CC selection manager 730, transmission manager 735, reception manager 740, application priority manager 745, packet type priority manager 750, and traffic monitor 755. Each of these modules may communicate, directly or indirectly, with one another (e.g., via one or more buses).

Mapping component 720 may identify a mapping between one or more applications at a first UE (e.g., 115-d or 115f) in the distributed wireless network and one or more component carriers of a set of available component carriers for transmissions between one or more other UEs 115 in the distributed wireless network. In some cases, a UE 115 may receive the mapping in one or more of a radio resource control (RRC) configuration message or a system information block (SIB) transmitted by a base station 105, or any combinations thereof. In some cases, a UE 115 may receive the mapping in one or more of an Open Mobile Alliance Device Management (OMA-DM) message from a vehicle-to-everything (V2X) control function at a core network 130, a unicast message from a third party V2X application server (AS) at the core network 130, a multimedia broadcast multicast service (MBMS) message from the V2X control function or the V2X AS, or any combinations thereof. In some cases, packets may be transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or via combinations thereof.

CC priority manager 725 may determine a priority associated with each component carrier of the set of available component carriers.

CC selection manager 730 may select a first subset of component carriers for transmitting a first transmission of a first application of the one or more applications based on the mapping, and the priority associated with each component carrier. In some cases, CC selection manager 730 may select a second subset of component carriers for receiving a second transmission from one of the one or more other UEs 115 in the distributed wireless network based on the mapping and the priority associated with each component carrier. In some cases, the set of available component carriers includes component carriers on which the first UE (e.g., 115-d or 115f) is configured to support transmission and receipt of communications in the distributed wireless network. In some cases, the first subset of component carriers includes component carriers on which the one or more other UEs 115 are monitoring for communications in the distributed wireless network. In some cases, the set of available component carriers includes component carriers on which the first UE (e.g., 115-d or 115f) is configured to support transmission and receipt of communications in the distributed wireless network. In some cases, the first subset of component carriers includes component carriers on which the one or more other UEs 115 may transmit communications in the distributed wireless network.

Transmission manager 735 may transmit the first transmission using the selected first subset of component carriers to the one or more other UEs 115. In some cases, the distributed wireless network supports vehicle-to-everything (V2X) communications, public safety device-to-device (D2D) communications, peer-to-peer (P2P) communications, or combinations thereof. Reception manager 740 may monitor the selected subset of component carriers for a transmission and receive the transmission using the selected subset of component carriers.

Application priority manager 745 may determine a priority associated with each of the one or more applications, and the selection of the first subset of component carriers may be based on the priority associated with the first application and the priority associated with each component carrier.

Packet type priority manager 750 may identify a first packet that is to be transmitted in the first transmission, the first packet having a first packet priority, and the selection of the first subset of component carriers may be based on the first packet priority, the priority associated with the first application and the priority associated with each component carrier.

Traffic monitor 755 may monitor an amount of traffic on each CC. In some cases, the selecting the first subset of component carriers is further based on an amount of traffic detected on one or more of component carriers of the set of available component carriers. In some cases, the amount of traffic detected on one or more of component carriers is determined based on a number of transmissions detected on each component carrier of the set of available component carriers during a time period prior to transmitting the first transmission.

Figure 8:
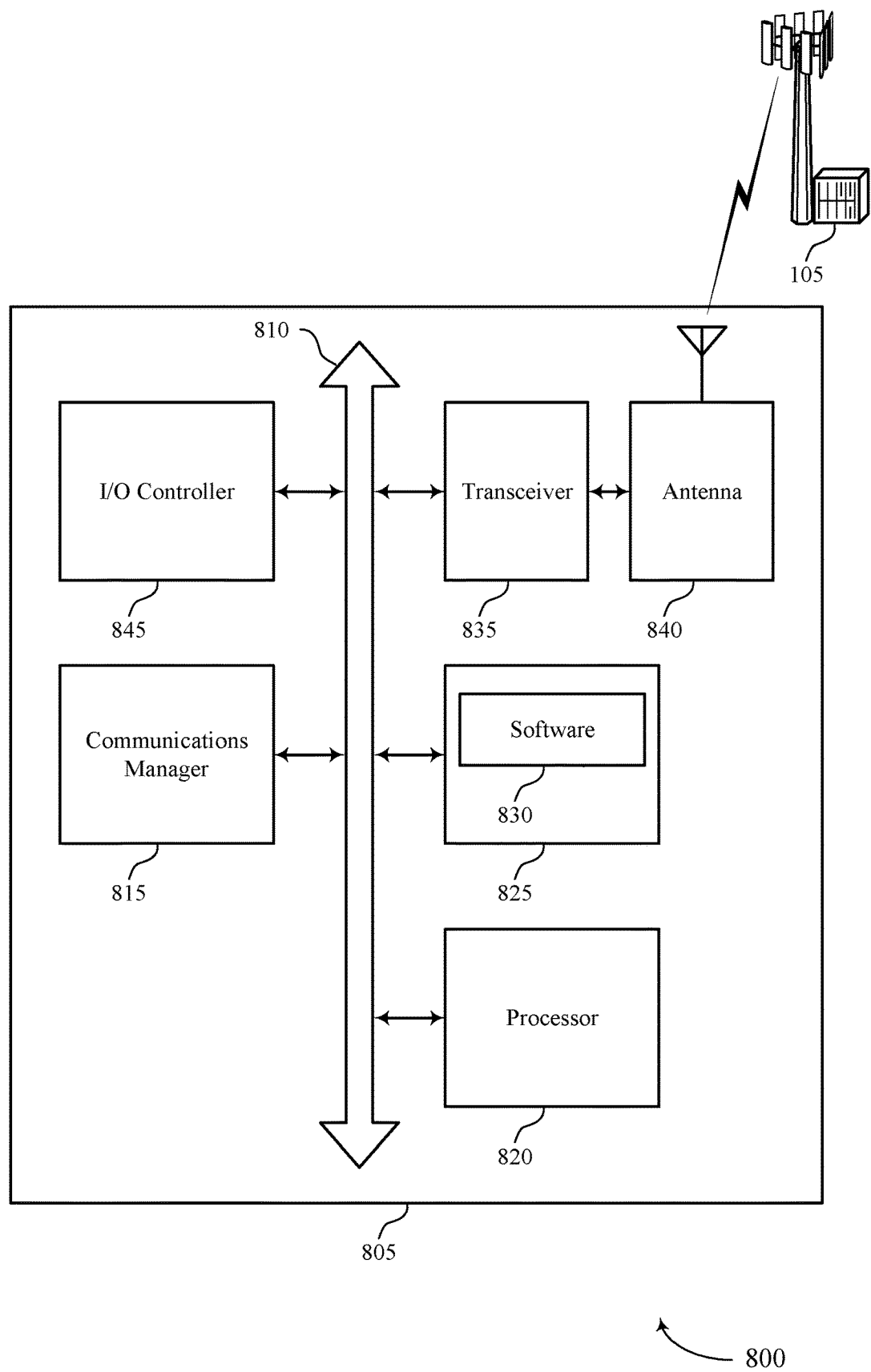
FIG. 8 illustrates a block diagram of a system including a UE that supports priority-based carrier selection in distributed wireless networks in accordance with aspects of the present disclosure.

FIG. 8 shows a diagram of a system 800 including a device 805 that supports priority-based carrier selection in distributed wireless networks in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting priority-based carrier selection in distributed wireless networks).

Memory 825 may include random access memory (RAM) and read only memory (ROM). Memory 825 may store computer-readable, computer-executable software 830 including instructions that, when executed, cause the processor to perform various functions described herein. In some cases, memory 825 may contain, among other things, a basic input/output system (BIOS) which may control basic hardware or software operation such as the interaction with peripheral components or devices.

Software 830 may include code to implement aspects of the present disclosure, including code to support priority-based carrier selection in distributed wireless networks. Software 830 may be stored in a non-transitory computer-readable medium such as system memory or other memory. In some cases, software 830 may not be directly executable by the processor but may cause a computer (e.g., when compiled and executed) to perform functions described herein.

Transceiver 835 may communicate bi-directionally, via one or more antennas, wired, or wireless links as described above. For example, transceiver 835 may represent a wireless transceiver and may communicate bi-directionally with another wireless transceiver. Transceiver 835 may also include a modem to modulate the packets and provide the modulated packets to the antennas for transmission, and to demodulate packets received from the antennas.

In some cases, the device 805 may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
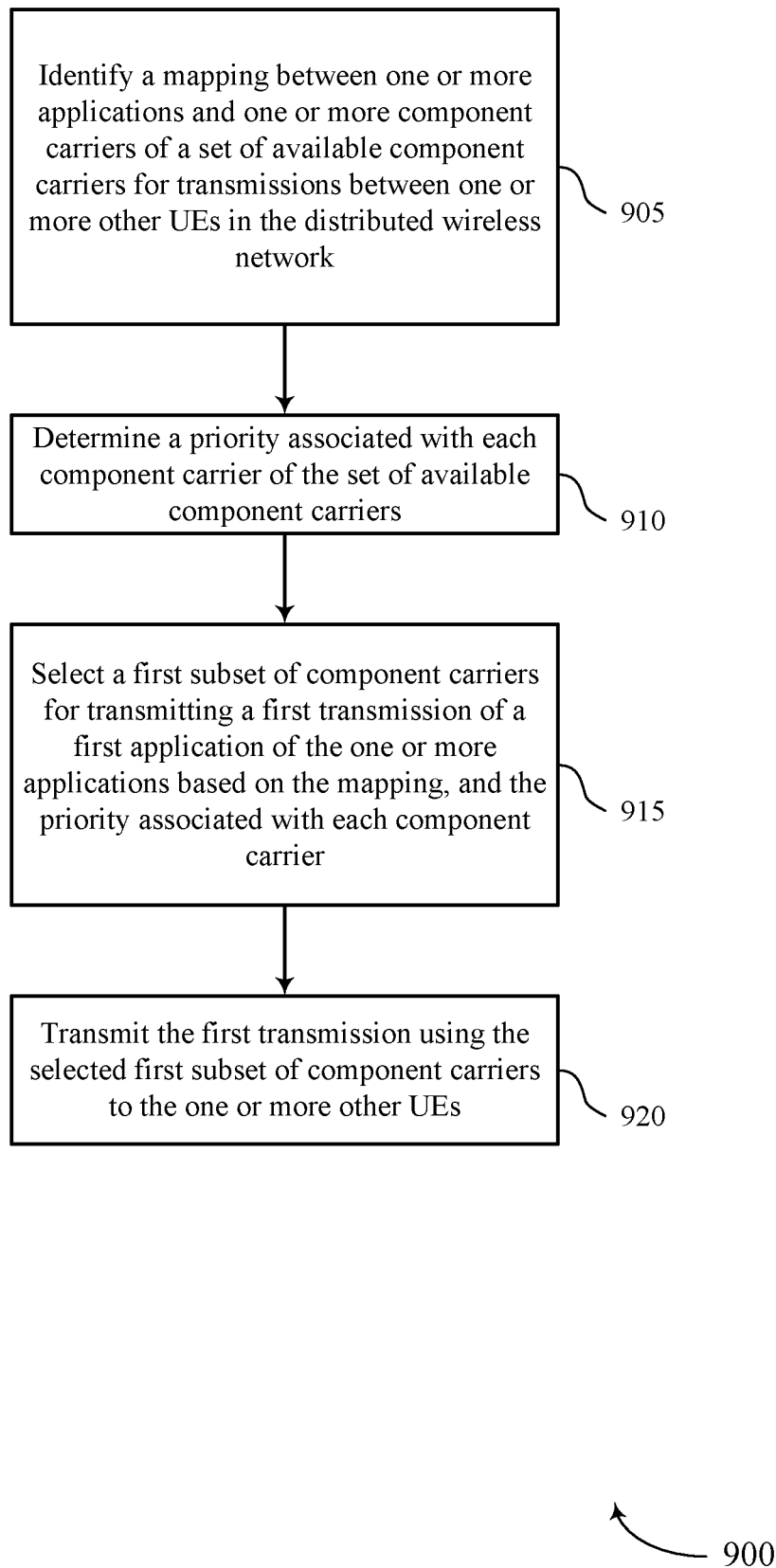
FIGS. 9 through 13 illustrate methods for priority-based carrier selection in distributed wireless networks in accordance with aspects of the present disclosure.

FIG. 9 shows a flowchart illustrating a method 900 for priority-based carrier selection in distributed wireless networks in accordance with aspects of the present disclosure. The operations of method 900 may be implemented by a UE 115 or its components as described herein. For example, the operations of method 900 may be performed by communications manager 515, 615, 715, or 815 as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905, the UE 115 may identify a mapping between one or more applications and one or more component carriers of a set of available component carriers for transmissions between one or more other UEs 115 in the distributed wireless network. The operations of block 905 may be performed according to the methods described herein. In certain examples, aspects of the operations of block 905 may be performed by mapping component 625 or 720 as described with reference to FIGS. 5 through 8.

At block 910, the UE 115 may determine a priority associated with each component carrier of the set of available component carriers. The operations of block 910 may be performed according to the methods described herein. In certain examples, aspects of the operations of block 910 may be performed by CC priority manager 630 or 725 as described with reference to FIGS. 5 through 8.

At block 915, the UE 115 may select a first subset of component carriers for transmitting a first transmission of a first application of the one or more applications based at least in part on the mapping, and the priority associated with each component carrier. The operations of block 915 may be performed according to the methods described herein. In certain examples, aspects of the operations of block 915 may be performed by CC selection manager 635 or 730 as described with reference to FIGS. 5 through 8.

At block 920, the UE 115 may transmit the first transmission using the selected first subset of component carriers to the one or more other UEs 115. The operations of block 920 may be performed according to the methods described herein. In certain examples, aspects of the operations of block 920 may be performed by transmission manager 640 or 735 as described with reference to FIGS. 5 through 8.

Figure 10:
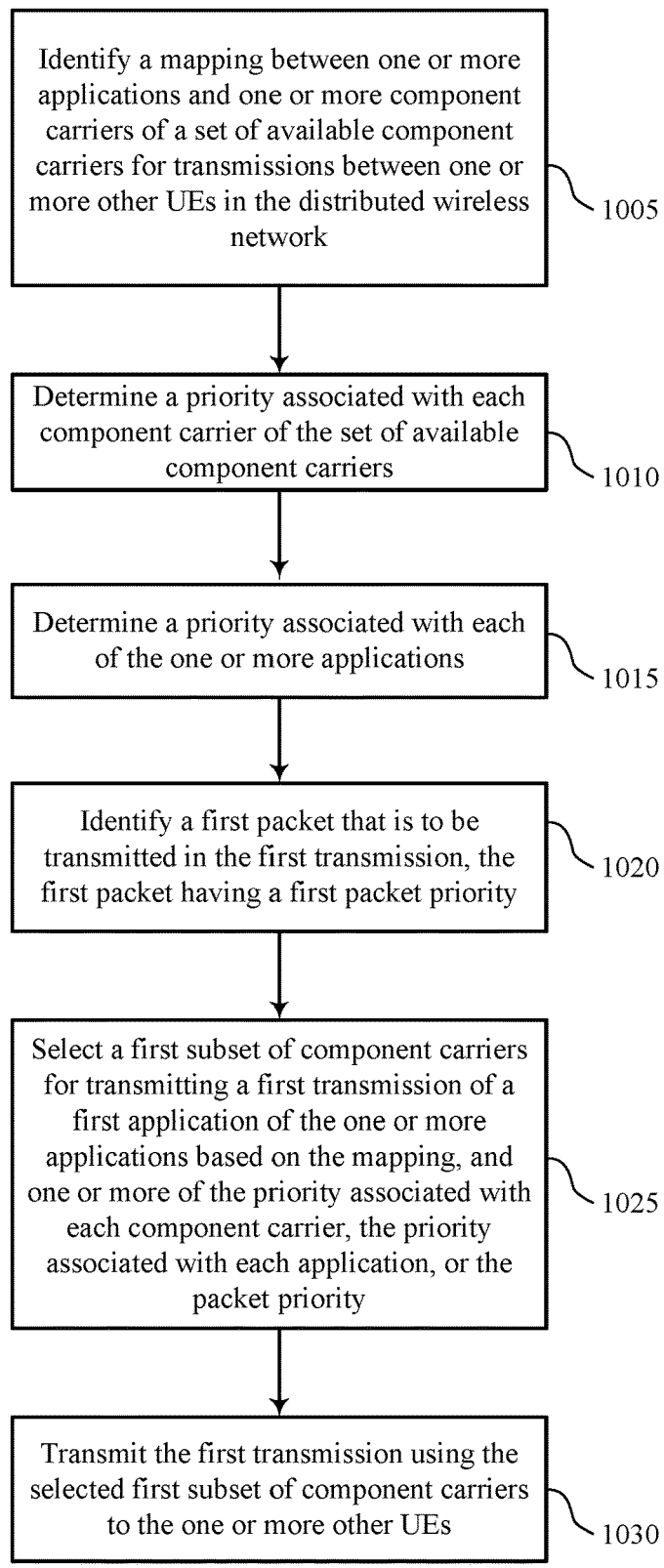

FIG. 10 shows a flowchart illustrating a method 1000 for priority-based carrier selection in distributed wireless networks in accordance with aspects of the present disclosure. The operations of method 1000 may be implemented by a UE 115 or its components as described herein. For example, the operations of method 1000 may be performed by communications manager 515, 615, 715, or 815 as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005, the UE 115 may identify a mapping between one or more applications and one or more component carriers of a set of available component carriers for transmissions between one or more other UEs 115 in the distributed wireless network. The operations of block 1005 may be performed according to the methods described herein. In certain examples, aspects of the operations of block 1005 may be performed by mapping component 625 or 720 as described with reference to FIGS. 5 through 8.

At block 1010, the UE 115 may determine a priority associated with each component carrier of the set of available component carriers. The operations of block 1010 may be performed according to the methods described herein. In certain examples, aspects of the operations of block 1010 may be performed by CC priority manager 630 or 725 as described with reference to FIGS. 5 through 8.

At block 1015, the UE 115 may determine a priority associated with each of the one or more applications. The operations of block 1015 may be performed according to the methods described herein. In certain examples, aspects of the operations of block 1015 may be performed by application priority manager 745 as described with reference to FIGS. 5 through 8.

At block 1020, the UE 115 may identify a first packet that is to be transmitted in the first transmission, the first packet having a first packet priority. The operations of block 1020 may be performed according to the methods described herein. In certain examples, aspects of the operations of block 1020 may be performed by packet type priority manager 750 as described with reference to FIGS. 5 through 8.

At block 1025, the UE 115 may select a first subset of component carriers for transmitting a first transmission of a first application of the one or more applications based on the mapping, and one or more of the priority associated with each component carrier, the priority associated with each application, or the packet priority. The operations of block 1025 may be performed according to the methods described herein. In certain examples, aspects of the operations of block 1025 may be performed by CC selection manager 635 or 730 as described with reference to FIGS. 5 through 8.

At block 1030, the UE 115 may transmit the first transmission using the selected first subset of component carriers to the one or more other UEs 115. The operations of block 1030 may be performed according to the methods described herein. In certain examples, aspects of the operations of block 1030 may be performed by transmission manager 640 or 735 as described with reference to FIGS. 5 through 8.

Figure 11:
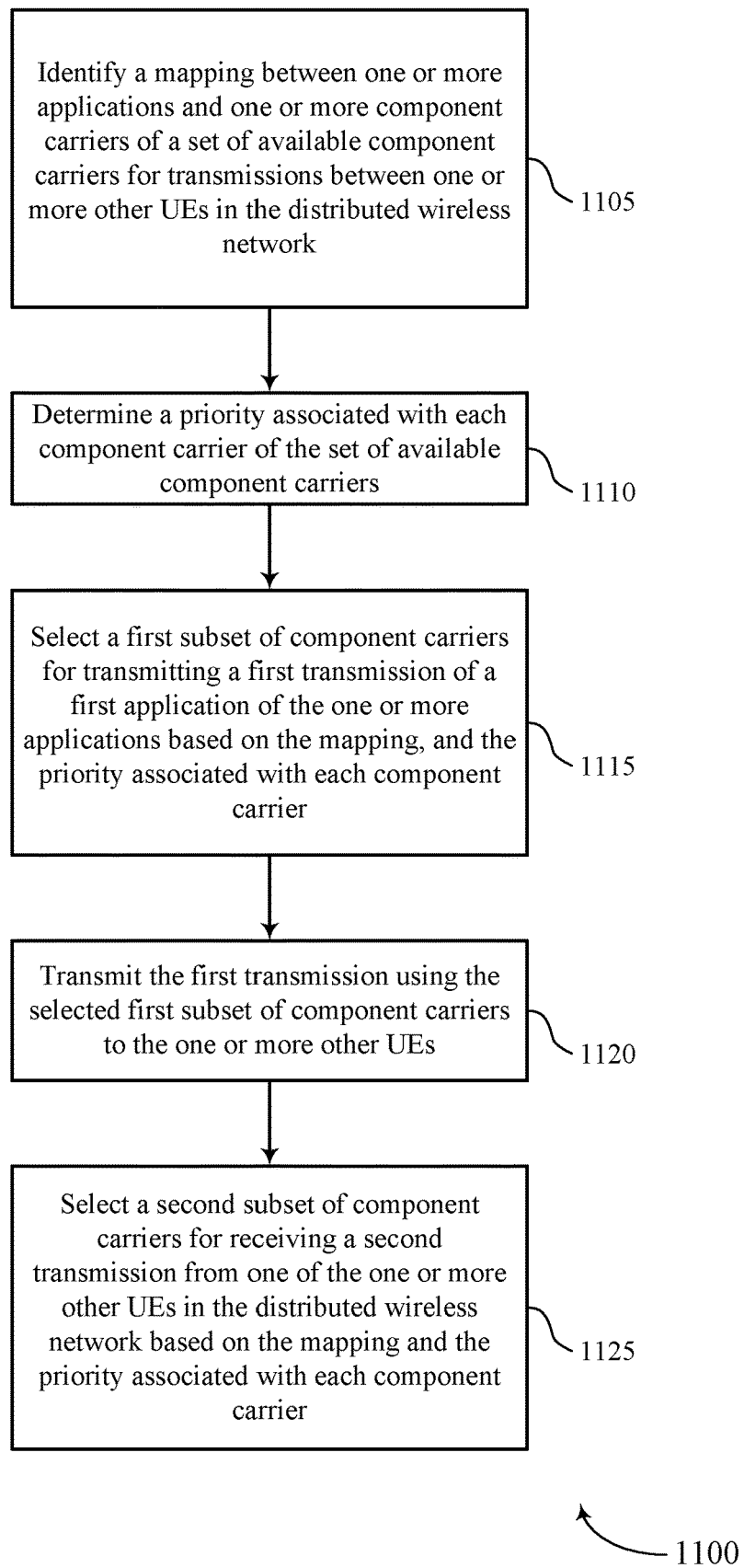

FIG. 11 shows a flowchart illustrating a method 1100 for priority-based carrier selection in distributed wireless networks in accordance with aspects of the present disclosure. The operations of method 1100 may be implemented by a UE 115 or its components as described herein. For example, the operations of method 1100 may be performed by communications manager 515, 615, 715, or 815 as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105, the UE 115 may identify a mapping between one or more applications and one or more component carriers of a set of available component carriers for transmissions between one or more other UEs 115 in the distributed wireless network. The operations of block 1105 may be performed according to the methods described herein. In certain examples, aspects of the operations of block 1105 may be performed by mapping component 625 or 720 as described with reference to FIGS. 5 through 8.

At block 1110, the UE 115 may determine a priority associated with each component carrier of the set of available component carriers. The operations of block 1110 may be performed according to the methods described herein. In certain examples, aspects of the operations of block 1110 may be performed by CC priority manager 630 or 725 as described with reference to FIGS. 5 through 8.

At block 1115, the UE 115 may select a first subset of component carriers for transmitting a first transmission of a first application of the one or more applications based at least in part on the mapping, and the priority associated with each component carrier. The operations of block 1115 may be performed according to the methods described herein. In certain examples, aspects of the operations of block 1115 may be performed by CC selection manager 635 or 730 as described with reference to FIGS. 5 through 8.

At block 1120, the UE 115 may transmit the first transmission using the selected first subset of component carriers to the one or more other UEs 115. The operations of block 1120 may be performed according to the methods described herein. In certain examples, aspects of the operations of block 1120 may be performed by transmission manager 640 or 735 as described with reference to FIGS. 5 through 8.

At block 1125, the UE 115 may select a second subset of component carriers for receiving a second transmission from one of the one or more other UEs 115 in the distributed wireless network based at least in part on the mapping and the priority associated with each component carrier. The operations of block 1125 may be performed according to the methods described herein. In certain examples, aspects of the operations of block 1125 may be performed by CC selection manager 635 or 730 as described with reference to FIGS. 5 through 8.

Figure 12:
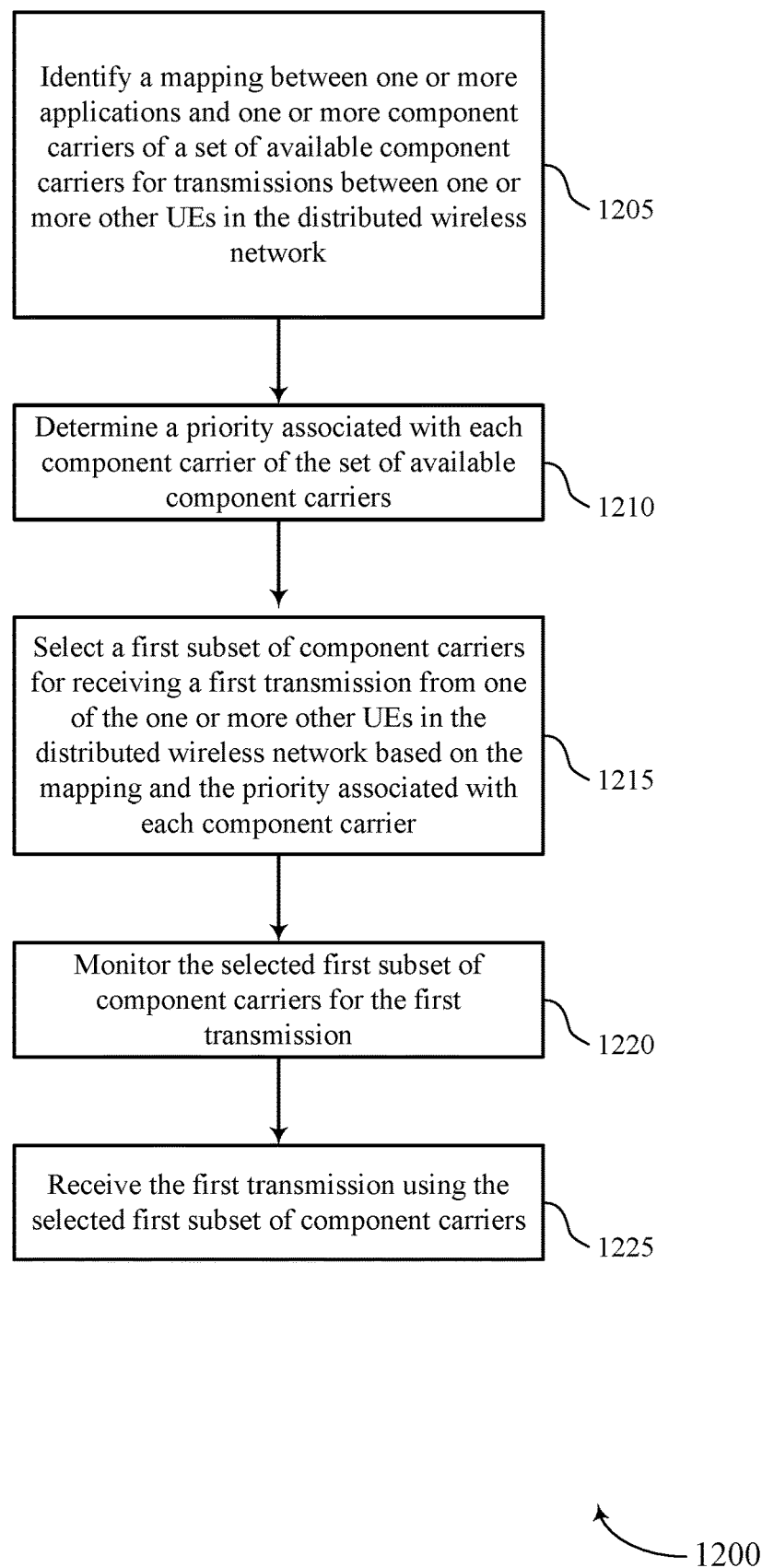

FIG. 12 shows a flowchart illustrating a method 1200 for priority-based carrier selection in distributed wireless networks in accordance with aspects of the present disclosure. The operations of method 1200 may be implemented by a UE 115 or its components as described herein. For example, the operations of method 1200 may be performed by communications manager 515, 615, 715, or 815 as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1205, the UE 115 may identify a mapping between one or more applications and one or more component carriers of a set of available component carriers for transmissions between one or more other UEs 115 in the distributed wireless network. The operations of block 1205 may be performed according to the methods described herein. In certain examples, aspects of the operations of block 1205 may be performed by mapping component 625 or 720 as described with reference to FIGS. 5 through 8.

At block 1210, the UE 115 may determine a priority associated with each component carrier of the set of available component carriers. The operations of block 1210 may be performed according to the methods described herein. In certain examples, aspects of the operations of block 1210 may be performed by CC priority manager 630 or 725 as described with reference to FIGS. 5 through 8.

At block 1215, the UE 115 may select a first subset of component carriers for receiving a first transmission from one of the one or more other UEs 115 in the distributed wireless network based at least in part on the mapping and the priority associated with each component carrier. The operations of block 1215 may be performed according to the methods described herein. In certain examples, aspects of the operations of block 1215 may be performed by CC selection manager 635 or 730 as described with reference to FIGS. 5 through 8.

At block 1220, the UE 115 may monitor the selected first subset of component carriers for the first transmission. The operations of block 1220 may be performed according to the methods described herein. In certain examples, aspects of the operations of block 1220 may be performed by a reception manager as described with reference to FIGS. 5 through 8.

At block 1225, the UE 115 may receive the first transmission using the selected first subset of component carriers. The operations of block 1225 may be performed according to the methods described herein. In certain examples, aspects of the operations of block 1225 may be performed by a reception manager as described with reference to FIGS. 5 through 8.

Figure 13:
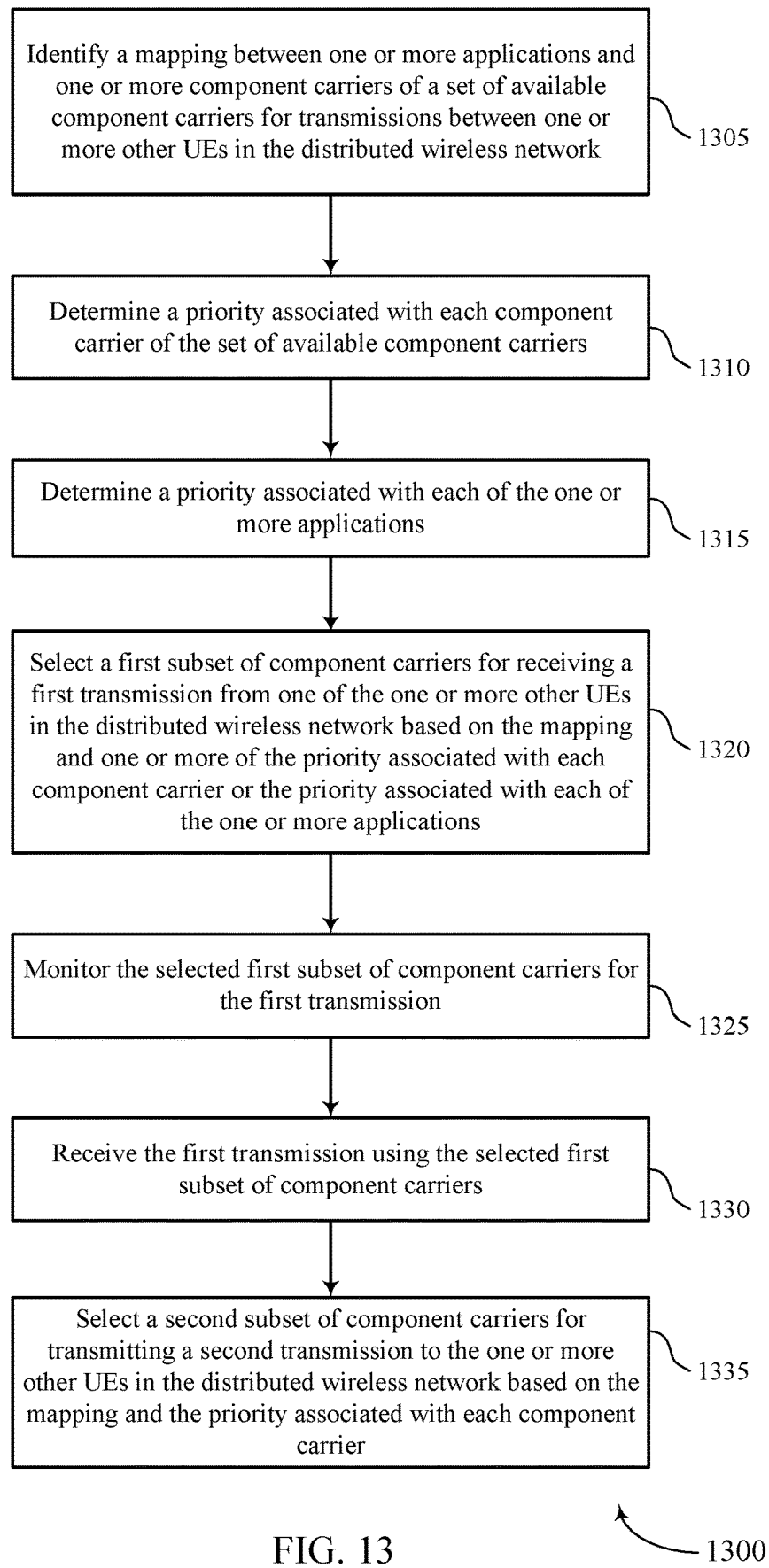

FIG. 13 shows a flowchart illustrating a method 1300 for priority-based carrier selection in distributed wireless networks in accordance with aspects of the present disclosure. The operations of method 1300 may be implemented by a UE 115 or its components as described herein. For example, the operations of method 1300 may be performed by communications manager 515, 615, 715, or 815 as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305, the UE 115 may identify a mapping between one or more applications and one or more component carriers of a set of available component carriers for transmissions between one or more other UEs 115 in the distributed wireless network. The operations of block 1305 may be performed according to the methods described herein. In certain examples, aspects of the operations of block 1305 may be performed by mapping component 625 or 720 as described with reference to FIGS. 5 through 8.

At block 1310, the UE 115 may determine a priority associated with each component carrier of the set of available component carriers. The operations of block 1310 may be performed according to the methods described herein. In certain examples, aspects of the operations of block 1310 may be performed by CC priority manager 630 or 725 as described with reference to FIGS. 5 through 8.

At block 1315, the UE 115 may determine a priority associated with each of the one or more applications. The operations of block 1315 may be performed according to the methods described herein. In certain examples, aspects of the operations of block 1315 may be performed by an application priority manager as described with reference to FIGS. 5 through 8.

At block 1320, the UE 115 may select a first subset of component carriers for receiving a first transmission from one of the one or more other UEs 115 in the distributed wireless network based on the mapping and one or more of the priority associated with each component carrier or the priority associated with each of the one or more applications. The operations of block 1320 may be performed according to the methods described herein. In certain examples, aspects of the operations of block 1320 may be performed by CC selection manager 635 or 730 as described with reference to FIGS. 5 through 8.

At block 1325, the UE 115 may monitor the selected first subset of component carriers for the first transmission. The operations of block 1325 may be performed according to the methods described herein. In certain examples, aspects of the operations of block 1325 may be performed by a reception manager as described with reference to FIGS. 5 through 8.

At block 1330, the UE 115 may receive the first transmission using the selected first subset of component carriers. The operations of block 1330 may be performed according to the methods described herein. In certain examples, aspects of the operations of block 1330 may be performed by a reception manager as described with reference to FIGS. 5 through 8.

At block 1335, the UE 115 may select a second subset of component carriers for transmitting a second transmission to the one or more other UEs 115 in the distributed wireless network based at least in part on the mapping and the priority associated with each component carrier. The operations of block 1335 may be performed according to the methods described herein. In certain examples, aspects of the operations of block 1335 may be performed by CC selection manager 635 or 730 as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a distributed wireless network, comprising:
   identifying a mapping between one or more applications at a first UE in the distributed wireless network and one or more component carriers of a set of available component carriers for transmissions between one or more other UEs in the distributed wireless network;
   determining an application priority associated with each of the one or more applications based at least in part on the mapping, wherein a first application of the one or more applications is associated with a higher or lower application priority than a second application of the one or more applications;
   determining a priority associated with each component carrier of the set of available component carriers;
   selecting a first subset of component carriers for transmitting a first transmission of the first application based at least in part on the first application being associated with the higher or lower application priority than the second application and the priority associated with each component carrier; and
   transmitting the first transmission using the selected first subset of component carriers to the one or more other UEs.

2. The method of claim 1, further comprising:
   identifying a first packet that is to be transmitted in the first transmission, the first packet having a first packet priority, and wherein the selecting further comprises selecting the first subset of component carriers based at least in part on the first packet priority, the application priority associated with the first application, and the priority associated with each component carrier.

3. The method of claim 1, further comprising:
   selecting a second subset of component carriers for receiving a second transmission from one of the one or more other UEs in the distributed wireless network based at least in part on the mapping and the priority associated with each component carrier.

4. The method of claim 1, wherein:
   the selecting the first subset of component carriers is further based at least in part on an amount of traffic detected on one or more of component carriers of the set of available component carriers.

5. The method of claim 4, wherein:
   the amount of traffic detected on one or more of component carriers is determined based at least in part on a number of transmissions detected on each component carrier of the set of available component carriers during a time period prior to transmitting the first transmission.

6. The method of claim 1, wherein:
   the set of available component carriers includes component carriers on which the first UE is configured to support transmission and receipt of communications in the distributed wireless network.

7. The method of claim 1, wherein:
   the first subset of component carriers includes component carriers on which the one or more other UEs are monitoring for communications in the distributed wireless network.

8. The method of claim 1, further comprising:
   receiving the mapping in one or more of a radio resource control (RRC) configuration message or a system information block (SIB) transmitted by a base station, or any combinations thereof.

9. The method of claim 1, further comprising:
   receiving the mapping in one or more of an Open Mobile Alliance Device Management (OMA-DM) message from a vehicle-to-everything (V2X) control function at a core network, a unicast message from a third party V2X application server (AS) at the core network, a multimedia broadcast multicast service (MBMS) message from the V2X control function or the V2X AS, or any combinations thereof.

10. The method of claim 1, wherein:
    the first transmission is transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or my combinations thereof.

11. The method of claim 1, wherein:
    the distributed wireless network supports vehicle-to-everything (V2X) communications, public safety device-to-device (D2D) communications, peer-to-peer (P2P) communications, or any combinations thereof.

12. The method of claim 1, wherein:
    the first application is associated with a first application priority and the second application is associated with a second application priority, the first application priority being higher than the second application priority; and
    selecting the first subset of component carriers for transmitting the first transmission of the first application is based at least in part on the first application priority being higher than the second application priority.

13. A method for wireless communication in a distributed wireless network, comprising:
    identifying a mapping between one or more applications at a first UE in the distributed wireless network and one or more component carriers of a set of available component carriers for transmissions between one or more other UEs in the distributed wireless network;
    determining an application priority associated with each of the one or more applications based at least in part on the mapping, wherein a first application of the one or more applications is associated with a higher or lower application priority than a second application of the one or more applications;
    determining a priority associated with each component carrier of the set of available component carriers;
    selecting a first subset of component carriers for receiving a first transmission from one of the one or more other UEs in the distributed wireless network based at least in part on the first application being associated with the higher or lower application priority than the second application and the priority associated with each component carrier;

monitoring the selected first subset of component carriers for the first transmission; and
receiving the first transmission using the selected first subset of component carriers.

14. The method of claim 13, further comprising:
selecting a second subset of component carriers for transmitting a second transmission to the one or more other UEs in the distributed wireless network based at least in part on the mapping and the priority associated with each component carrier.

15. The method of claim 13, wherein:
the set of available component carriers includes component carriers on which the first UE is configured to support transmission and receipt of communications in the distributed wireless network.

16. The method of claim 13, wherein:
the first subset of component carriers includes component carriers on which the one or more other UEs may transmit communications in the distributed wireless network.

17. The method of claim 13, further comprising:
receiving the mapping in one or more of a radio resource control (RRC) configuration message or a system information block (SIB) transmitted by a base station, or any combinations thereof.

18. The method of claim 13, further comprising:
receiving the mapping in one or more of an Open Mobile Alliance Device Management (OMA-DM) message from a vehicle-to-everything (V2X) control function at a core network, a unicast message from a third party V2X application server (AS) at the core network, a multimedia broadcast multicast service (MBMS) message from the V2X control function or the V2X AS, or any combinations thereof.

19. The method of claim 13, wherein:
the first transmission is transmitted via a vehicle-to-everything (V2X) message payload, via a Packet Data Convergence Protocol (PDCP) header extension, via a media access control (MAC) payload, as advertised by a metadata bit included in a sidelink control information (SCI) message, or my combinations thereof.

20. The method of claim 13, wherein:
the distributed wireless network supports vehicle-to-everything (V2X) communications, public safety device-to-device (D2D) communications, peer-to-peer (P2P) communications, or any combinations thereof.

21. The method of claim 13, wherein:
the first application is associated with a first application priority and the second application is associated with a second application priority, the first application priority being higher than the second application priority; and
selecting the first subset of component carriers for receiving the first transmission is based at least in part on the first application priority being higher than the second application priority.

22. An apparatus for wireless communication in a distributed wireless network, comprising:
a processor;
memory in electronic communication with the processor; and
instructions stored in the memory and operable, when executed by the processor, to cause the apparatus to:
identify a mapping between one or more applications at a first UE in the distributed wireless network and one or more component carriers of a set of available component carriers for transmissions between one or more other UEs in the distributed wireless network;
determine an application priority associated with each of the one or more applications based at least in part on the mapping, wherein a first application of the one or more applications is associated with a higher or lower application priority than a second application of the one or more applications;
determine a priority associated with each component carrier of the set of available component carriers;
select a first subset of component carriers for transmitting a first transmission of the first application based at least in part on the first application being associated with the higher or lower application priority than the second application and the priority associated with each component carrier; and
transmit the first transmission using the selected first subset of component carriers to the one or more other UEs.

23. The apparatus of claim 22, wherein the instructions, when executed by the processor, further cause the apparatus to:
identify a first packet that is to be transmitted in the first transmission, the first packet having a first packet priority, and wherein the selecting further comprises selecting the first subset of component carriers based at least in part on the first packet priority, the application priority associated with the first application, and the priority associated with each component carrier.

24. The apparatus of claim 22, wherein the instructions, when executed by the processor, further cause the apparatus to:
select a second subset of component carriers for receiving a second transmission from one of the one or more other UEs in the distributed wireless network based at least in part on the mapping and the priority associated with each component carrier.

25. The apparatus of claim 22, wherein:
the instructions to select the first subset of component carriers are further based at least in part on an amount of traffic detected on one or more of component carriers of the set of available component carriers.

26. The apparatus of claim 25, wherein:
the amount of traffic detected on one or more of component carriers is determined based at least in part on a number of transmissions detected on each component carrier of the set of available component carriers during a time period prior to transmitting the first transmission.

27. An apparatus for wireless communication in a distributed wireless network, comprising:
a processor;
memory in electronic communication with the processor; and
instructions stored in the memory and operable, when executed by the processor, to cause the apparatus to:
identify a mapping between one or more applications at a first UE in the distributed wireless network and one or more component carriers of a set of available component carriers for transmissions between one or more other UEs in the distributed wireless network;
determine an application priority associated with each of the one or more applications based at least in part on the mapping, wherein a first application of the one or more applications is associated with a higher or lower application priority than a second application of the one or more applications;
determine a priority associated with each component carrier of the set of available component carriers;

select a first subset of component carriers for receiving a first transmission from one of the one or more other UEs in the distributed wireless network based at least in part on the first application being associated with the higher or lower application priority than the second application and the priority associated with each component carrier;

monitor the selected first subset of component carriers for the first transmission; and receive the first transmission using the selected first subset of component carriers.

28. The apparatus of claim 27, wherein the instructions, when executed by the processor, further cause the apparatus to:

select a second subset of component carriers for transmitting a second transmission to the one or more other UEs in the distributed wireless network based at least in part on the mapping and the priority associated with each component carrier.

* * * * *